(12) United States Patent
Wisniewski

(10) Patent No.: US 11,527,101 B1
(45) Date of Patent: Dec. 13, 2022

(54) BIOMETRIC GALLERY MANAGEMENT USING WIRELESS IDENTIFIERS

(71) Applicant: Alclear, LLC, New York, NY (US)

(72) Inventor: Rob Wisniewski, New York, NY (US)

(73) Assignee: ALCLEAR, LLC, New York, NY (US)

( * ) Notice: Subject to any disclaimer, the term of this patent is extended or adjusted under 35 U.S.C. 154(b) by 0 days.

(21) Appl. No.: 17/399,495

(22) Filed: Aug. 11, 2021

(51) Int. Cl.
| G06K 9/36 | (2006.01) |
| G06K 9/62 | (2022.01) |
| G06V 40/12 | (2022.01) |
| G06V 40/16 | (2022.01) |
| G06V 40/18 | (2022.01) |

(52) U.S. Cl.
CPC ........ *G06V 40/1365* (2022.01); *G06V 40/172* (2022.01); *G06V 40/197* (2022.01)

(58) Field of Classification Search
CPC ..... G06V 40/12–40/1394; G06V 40/50–40/58
See application file for complete search history.

(56) References Cited

U.S. PATENT DOCUMENTS

| 6,012,039 | A | * | 1/2000 | Hoffman | G06Q 20/10 |
| | | | | | 705/76 |
| 6,119,096 | A | | 9/2000 | Mann et al. | |
| 8,381,969 | B1 | | 2/2013 | Miller et al. | |
| 8,423,462 | B1 | | 4/2013 | Amacker et al. | |
| 8,521,131 | B1 | | 8/2013 | Ramalingam et al. | |
| 8,744,966 | B1 | | 6/2014 | Amacker et al. | |
| 8,965,170 | B1 | | 2/2015 | Benea | |
| 9,107,064 | B1 | | 8/2015 | Ramalingam et al. | |
| 9,166,961 | B1 | | 10/2015 | Johansson et al. | |
| 9,202,105 | B1 | | 12/2015 | Wang et al. | |
| 9,324,098 | B1 | | 4/2016 | Agrawal et al. | |
| 9,386,507 | B1 | | 7/2016 | Ramalingam et al. | |
| 9,607,138 | B1 | | 3/2017 | Baldwin et al. | |
| 9,609,577 | B1 | | 3/2017 | Ramalingam et al. | |
| 9,681,350 | B1 | | 6/2017 | Marupaduga et al. | |
| 9,681,359 | B2 | | 6/2017 | Ramalingam et al. | |

(Continued)

OTHER PUBLICATIONS

Trochu et al., "Managing the Border, Smartly," European and Security Informatics Conference, IEEE, pp. 281-284, Aug. 12, 2013.

*Primary Examiner* — Brian Werner
(74) *Attorney, Agent, or Firm* — Brownstein Hyatt Farber Schreck, LLP

(57) ABSTRACT

Biometric gallery management is performed by association one or more wireless identifiers that correspond to one or more mobile devices (such as smart phones, tablet computing devices, cellular telephones, wearable devices, smart watches, fitness monitors, digital media players, medical devices, and/or other mobile computing devices) that people carry with digital representations of biometrics corresponding to the people. Wireless identifiers corresponding to mobile devices proximate to a biometric reader device may be monitored. Upon detection of wireless identifiers corresponding to mobile devices proximate to the biometric reader device, the associated digital representations of biometrics may be loaded from a main gallery into one or more local galleries, which may then be used to perform one or more biometric identifications and/or verifications.

20 Claims, 13 Drawing Sheets

(56) References Cited

U.S. PATENT DOCUMENTS

| | | |
|---|---|---|
| 9,723,131 B1 | 8/2017 | Ramalingam et al. |
| 9,836,642 B1 | 12/2017 | Ramaswamy |
| 9,934,504 B2 | 4/2018 | Wang et al. |
| 9,947,155 B2 | 4/2018 | Trani et al. |
| 9,967,250 B2 | 5/2018 | Johansson et al. |
| 10,027,662 B1 | 7/2018 | Mutagi et al. |
| 10,055,740 B2 | 8/2018 | Hanson et al. |
| 10,104,181 B1 | 10/2018 | Rao et al. |
| 10,108,791 B1 | 10/2018 | Masterman |
| 10,108,961 B2 | 10/2018 | Wang et al. |
| 10,122,727 B2 | 11/2018 | Johansson et al. |
| 10,235,669 B2 | 3/2019 | Amacker et al. |
| 10,242,364 B2 | 3/2019 | Wang et al. |
| 10,243,945 B1 | 3/2019 | Kruse et al. |
| 10,403,066 B2 | 9/2019 | Trani et al. |
| 10,929,661 B1 | 2/2021 | Manyam |
| 11,127,236 B1* | 9/2021 | Kocher .............. G06V 40/50 |
| 11,151,481 B1 | 10/2021 | Sun et al. |
| 2004/0172403 A1 | 9/2004 | Steele |
| 2004/0221303 A1 | 11/2004 | Sie |
| 2006/0083408 A1 | 4/2006 | Hoffman et al. |
| 2006/0279422 A1 | 12/2006 | Sweatte et al. |
| 2007/0206839 A1 | 9/2007 | Hanna et al. |
| 2008/0126809 A1 | 5/2008 | Rothschild et al. |
| 2010/0312763 A1 | 12/2010 | Peirce |
| 2010/0316262 A1 | 12/2010 | Kuwahara et al. |
| 2011/0032076 A1 | 2/2011 | Rickman et al. |
| 2011/0134240 A1* | 6/2011 | Anderson ............... H04W 4/02 348/143 |
| 2012/0019379 A1 | 1/2012 | Ben Ayed |
| 2013/0002399 A1 | 1/2013 | Frueh et al. |
| 2013/0036309 A1 | 2/2013 | Kevenaar et al. |
| 2013/0036480 A1 | 2/2013 | Anderson et al. |
| 2013/0051630 A1 | 2/2013 | Marques et al. |
| 2013/0251216 A1 | 9/2013 | Smowton et al. |
| 2014/0189720 A1 | 7/2014 | Terrazas |
| 2014/0314283 A1 | 10/2014 | Harding et al. |
| 2015/0278398 A1 | 10/2015 | Roller et al. |
| 2015/0294515 A1 | 10/2015 | Bergdale |
| 2016/0026782 A1 | 1/2016 | Smowton et al. |
| 2016/0055327 A1 | 2/2016 | Moran et al. |
| 2016/0189063 A1 | 6/2016 | Nie |
| 2016/0269411 A1 | 9/2016 | Malachi et al. |
| 2016/0343187 A1 | 11/2016 | Trani et al. |
| 2016/0344091 A1 | 11/2016 | Trani et al. |
| 2017/0188103 A1 | 6/2017 | Pan |
| 2017/0318141 A1 | 11/2017 | Gerace et al. |
| 2018/0005160 A1 | 1/2018 | Johnson, III et al. |
| 2018/0007060 A1 | 1/2018 | Leblang et al. |
| 2019/0036939 A1 | 1/2019 | Johansson et al. |
| 2019/0050631 A1 | 2/2019 | Hayase |
| 2020/0028971 A1 | 1/2020 | Rapp et al. |
| 2020/0211312 A1 | 7/2020 | Wisniewski |
| 2020/0388363 A1* | 12/2020 | Docktor ................ G16H 10/60 |
| 2021/0201061 A1 | 7/2021 | Lupowitz |
| 2021/0225116 A1 | 7/2021 | Wisniewski |
| 2021/0264185 A1 | 8/2021 | Lupowitz |

\* cited by examiner

BIOMETRIC GALLERY MANAGEMENT USING WIRELESS IDENTIFIERS

FIELD

The described embodiments relate generally to biometric gallery management. More particularly, the present embodiments relate to biometric gallery management using wireless identifiers.

BACKGROUND

Biometric identification systems may identify people using biometrics. Biometrics may include fingerprints, palm prints, irises, eyes, faces, voices, gaits, pictures, or other identifying characteristics about a person. A biometric identification system may capture information about a biometric using a biometric reader and identify a person by comparing the captured information against stored information. For example, an image sensor may capture an image of a fingerprint and compare the image of the fingerprint against stored fingerprint images.

SUMMARY

The present disclosure relates to biometric gallery management using wireless identifiers. One or more wireless identifiers that correspond to one or more mobile devices (such as smart phones, tablet computing devices, cellular telephones, wearable devices, smart watches, fitness monitors, digital media players, medical devices, and/or other mobile computing devices) that people carry may be associated with digital representations of biometrics corresponding to the people. Wireless identifiers corresponding to mobile devices proximate to a biometric reader device may be monitored. Upon detection of wireless identifiers corresponding to mobile devices proximate to the biometric reader device, the associated digital representations of biometrics may be loaded from a main gallery into one or more local galleries, which may then be used to perform one or more biometric identifications and/or verifications. Associations between digital representations of biometrics and one or more wireless identifiers may be determined, stored, and/or updated using digital representations of biometrics from one or more identifications and/or verifications and wireless identifiers corresponding to one or more mobile devices detected proximate to one or more biometric reader devices.

In various embodiments, a system for biometric gallery management using wireless identifiers includes a server and a station. The server is operable to receive a wireless identifier at a first time, receive a digital representation of a first biometric, and store an association between the wireless identifier and the digital representation of the first biometric in a storage medium. The station is operable to receive the wireless identifier at a second time, communicate the wireless identifier to the server, load the digital representation of the first biometric into a local gallery based on a response from the server, and perform a biometric identification by comparing a digital representation of a second biometric to the digital representation of the first biometric stored in the local gallery.

In some examples, the server is further operable to anonymize the wireless identifier in the association by hashing the wireless identifier. In a number of examples, the server is further operable to receive a request to remove the wireless identifier and remove the association and the wireless identifier from the storage medium in response to the request. In various examples, the server is further operable to receive a request to remove the association and remove the association from the storage medium in response to the request.

In a number of examples, the server is further operable to determine that the wireless identifier is included in multiple associations and remove at least one of the multiple associations from the storage medium. In some examples, the server is further operable to determine that the wireless identifier is unassociated with a threshold number of subsequent identifications or is not subsequently received within a threshold amount of time and, in response to determining that the wireless identifier is unassociated with the threshold number of subsequent identifications or is not subsequently received within a threshold amount of time, remove the association from the storage medium. In various examples, the server is further operable to receive a notification related to information in an app or application executing on an electronic device related to an activity performed by a person and instruct the station to load a digital representation of a third biometric associated with the person into the local gallery in response to the notification.

In some embodiments, a system for biometric gallery management using wireless identifiers includes a communication unit operable to receive a wireless identifier, a biometric reader device operable to generate a digital representation of a biometric, a non-transitory storage medium that stores instructions, and a processor. The processor is operable to execute the instructions to receive at least one stored digital representation of a biometric to load into a local gallery from a server in response to communicating the wireless identifier and perform a biometric identification by comparing the digital representation of the biometric to the at least one stored digital representation of the biometric in the local gallery.

In various examples, the wireless identifier is a first wireless identifier, the digital representation of the biometric is a digital representation of a first biometric, and the processor is further operable to receive a second wireless identifier, receive a digital representation of a second biometric, and request that the server associate the second wireless identifier with the digital representation of the second biometric. In some implementations of such examples, the processor requests that the server associate the second wireless identifier with the digital representation of the second biometric when the digital representation of the second biometric is received within a threshold amount of time of when the second wireless identifier is received. In a number of implementations of such examples, the processor communicates with a mobile device via the communication unit using the second wireless identifier. In various implementations of such examples, the processor receives a confirmation from the mobile device to associate the second wireless identifier with the digital representation of the second biometric.

In some examples, the processor is further operable to transmit the digital representation of the biometric to the server if the biometric identification using the local gallery fails.

In a number of embodiments, a system for biometric gallery management using wireless identifiers includes a memory allocation configured to store at least one executable asset and a processor allocation configured to access the memory allocation and execute the at least one executable asset to instantiate a gallery management service and a biometric identification service. The gallery management service is operable to receive a wireless identifier at a first time, receive a digital representation of a first biometric, store an association between the wireless identifier and the digital representation of the first biometric in a storage medium, and load the digital representation of the first biometric into a gallery in response to receiving the wireless identifier at a second time. The biometric identification service is operable to perform a biometric identification by comparing a digital representation of a second biometric to the digital representation of the first biometric stored in the gallery.

In various examples, the gallery management service receives the wireless identifier from an associated application executing on a mobile device associated with the wireless identifier. In some examples, the system further includes a wireless beacon and the gallery management service receives the wireless identifier from a mobile device after the mobile device receives a signal from the wireless beacon. In a number of examples, the gallery management service is further operable to determine that the wireless identifier is associated with multiple identities and disassociate the wireless identifier from an identity of the multiple identities that has the fewest associations with the wireless identifier. In various examples, the wireless identifier is a first wireless identifier, the digital representation of the biometric is a digital representation of a first biometric, and the gallery management service is further operable to receive a second wireless identifier, receive information specifying an identity that is associated with a digital representation of a second biometric, and associate the second wireless identifier with the digital representation of the second biometric. In some implementations of such examples, the gallery management service receives the second wireless identifier and the information from a mobile device associated with the second wireless identifier.

In a number of examples, the wireless identifier is a first wireless identifier and the gallery management service is further operable to determine that the wireless identifier is not subsequently received and that a second wireless identifier is associated with the digital representation of the biometric and remove the association.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
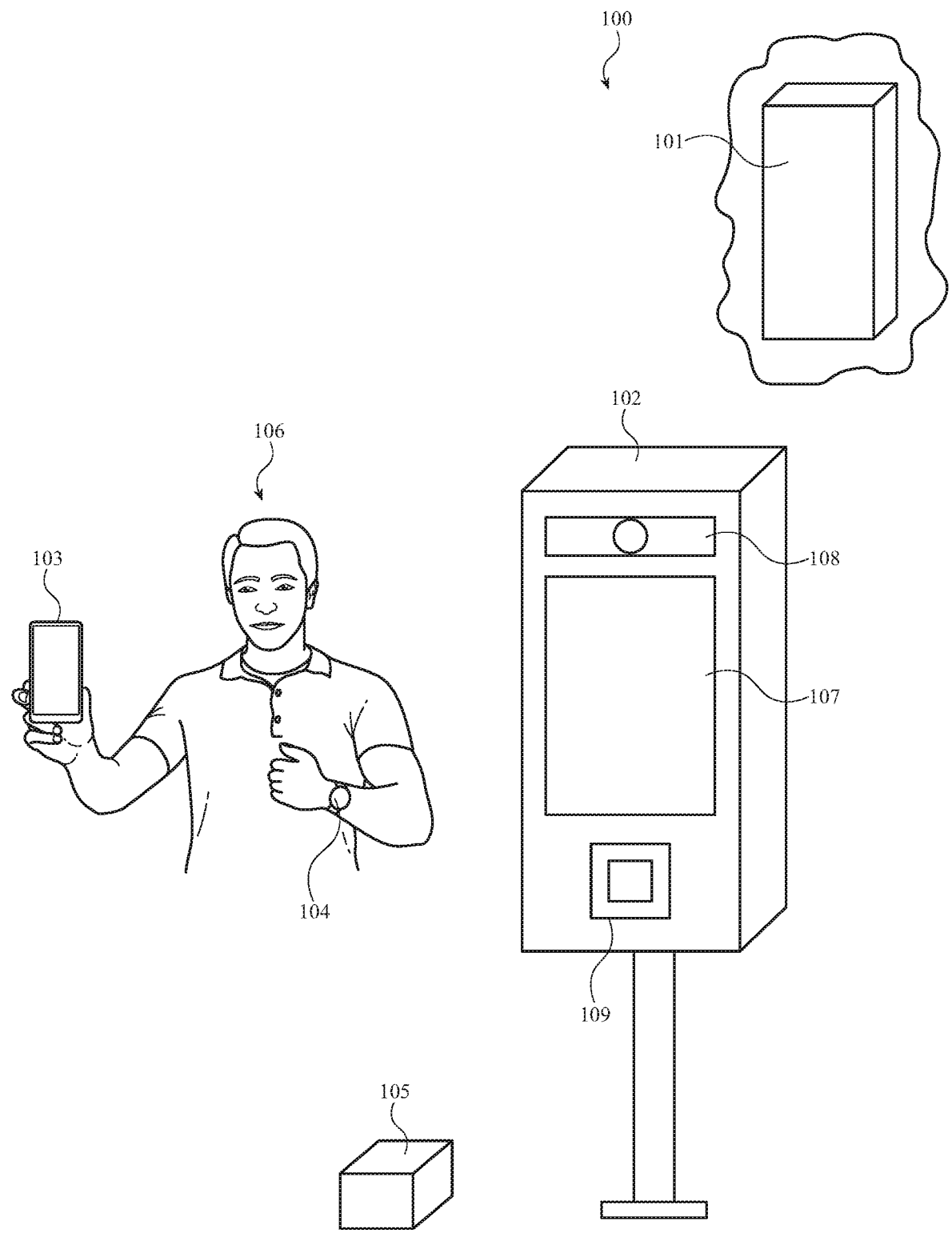
FIG. 1 depicts a first example system for biometric gallery management using wireless identifiers.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

Biometric galleries may be managed using wireless identifiers. In the context of the present application, a "wireless identifier" may be an address, name, or other structure that uniquely identifies an electronic device (such as a mobile device) or communication component thereof in wireless communication. Examples of wireless identifiers may include one or more Bluetooth™ identifiers, Bluetooth™ Low Energy or LE identifiers, cellular identifiers, Wi-Fi identifiers, Ethernet identifiers, Near-field communication identifiers, media access control address identifiers, and so on. Use of wireless identifiers to manage biometric galleries is discussed in detail below.

Embodiments discussed herein may generally apply to two types of biometric matching, namely "verification" matching and "identification" matching. Verification matches may be made to determine a person's identity from among a group of known people culled from a larger pool, while identification matches may be made to determine an individual's identity from the larger pool itself (e.g., rather than against a subset of the pool, as in verification).

Verification may assume knowledge of the person presenting themselves, and may verify his or her identity using biometric matching. This process may use a small number of potential matches, as the verification process itself may deeply narrow down the potential matching candidates in advance. This is referred to as 1-to-1 or 1-to-few matching, where "few" may mean a relatively small pool of potential candidates to match against, such as less than 20. Verification may be a useful biometric matching solution when there is some knowledge introduced at the exact time of the biometric match, like an identification card with a name or other personal identifier.

In these cases, a workflow may include a) presenting an identification token with a personal identifier on it, b) reading the personal identifier and querying a biometric repository to identify potential matches, c) performing a biometric match against the returned potential matches, and d) responding with a match result. One example of this type of use may be when a person puts their ATM card in a bank machine, and the bank ATM then takes a photo of their face and compares it to the registered face associated with the accounts associated with the presented ATM card. In that case, the facial recognition matching is only comparing the photo to the faces associated with that account, not all faces for all accounts registered at that bank.

Identification may assume no advanced knowledge of who is presenting themselves to be identified. This process may be referred to as 1-to-many or 1-to-n. Identification operations may be much more complex than verification operations, as they may rely on using the biometrics themselves, and they may search against the entire gallery of enrolled individuals, which may measure into the hundreds of millions of identities.

The process of doing 1-to-many identifications against a group of biometrically enrolled individuals may consist of the following steps:

1. Build a "gallery" of enrollment templates. A gallery may be a set of biometric templates for enrolled individuals. Each template may be associated with an enrolled identity. A template may be a binary string that is produced by running an algorithm against a biometric image (e.g., fingerprint, iris, face, and so on).

2. Place the gallery in an infrastructure that has a matching algorithm. If the gallery size is large, this infrastructure may be very large, as measured by the number of servers or core processes that may run in parallel to handle large gallery size or concurrent identification requests.

3. As probe images are sent to the matching infrastructure, the matching algorithm may attempt to find an identity within some acceptable matching threshold. A probe image may be an image taken at the time an individual is to be biometrically identified. It may be turned into a probe template using the same or similar logic to create gallery templates, and that probe template may be introduced to the matching algorithm and may produce match results.

Challenges to overcome with biometric matching solutions may include 1) accuracy, 2) latency, and 3) throughput.

Accuracy may be determined by a measure of False Positive Rate (FPR) and False Negative Rate (FNR). A given matching algorithm may have defined rates of these measures, and they may be variable based on the number of templates in the gallery. As the gallery grows, it may be challenging to keep the accuracy stable, perhaps even high.

Latency may mean the time it takes for a single identification operation, and throughput may mean how many identifications can be done within a given period of time. A given matching algorithm may be optimized for (or may generally address) one or both of these measures.

Some biometrics, by their very nature, may be faster or more accurate than others. Likewise, some biometrics may be slower or less accurate than others. Entities that choose to implement biometric identification may take many factors into account as to which biometrics they want to consider.

Some major factors to consider may include importance of accurate identification, user experience, timeliness of response, and cost of infrastructure.

More mature and "high-touch" biometric matching solutions, like fingerprints and irises, may deliver high accuracy and speed with smaller cost to infrastructure, but may deliver such results at the expense of user experience. The biometrics may operate within a well-defined set of quality and acceptance criteria, and the biometric capture devices may be specialized to capture only good images under ideal sets of conditions.

Newer "low-touch" biometric matching solutions, like facial recognition, may deliver a very desirable user experience, but may deliver such at the cost of accuracy, speed, and cost to infrastructure. The biggest challenge with some of the "low-touch" biometric matching solutions may be that they are impacted by many more external factors that may impact results, lighting for facial recognition, for example. The combination of both less mature matching algorithms as well as the high level of deviation of biometric images for the same identity because of external conditions may lead to a significant impact in both accuracy and speed for these "low-touch" biometrics. This accuracy drop-off may become very relevant as the size of the gallery grows. In some facial recognition matching algorithms, a gallery size of 50,000 may be where accuracy begins to degrade dramatically to the point of becoming useless. This may be extremely limiting when a desired gallery size of 100 million is desired for an identification operation.

In order to improve accuracy, latency, and/or throughput, the present disclosure may generate one or more subset galleries or "local galleries" from the gallery, which may be designated the "main gallery." Such a local gallery may store a portion of the digital representations of biometrics and/or other biometric information stored by the main gallery. As such, performing biometric matching against the local gallery may be more accurate, lower latency, and/or higher throughput than matching against the main gallery. Biometric matching against the local gallery that is unsuccessful may failover into matching against the main gallery (and/or one or more local galleries where one or more local galleries are created, such as different subsets of the main gallery).

In the context of this disclosure, terms such as "biometric information," "biometric data," "information about biometrics," "data regarding biometrics," and/or similar terms may refer to any kind of information related to biometrics. This may include, but is not limited to, full and/or partial images of biometrics, digital representations of biometrics, hashes, encodings of biometrics, and/or any other digital or other data structure that may indicate and/or store information regarding one or more biometrics.

The local gallery may be stored in a storage device that is faster to access than the main gallery, such as on a more quickly accessible storage device (such as on a memory or cache versus a hard drive or other longer term storage), on a closer device that has less network latency and/or does not require network communication (such as on a device that performs the biometric matching versus one or more servers and/or server allocations with which the device that performs the biometric matching communicates), and so on. Alternatively, the local gallery and main gallery may be stored on the same storage device and/or device and the improvement to accuracy, latency, and/or throughput may come from performing biometric matching against the relatively smaller size of the local gallery versus the main gallery.

The accuracy, latency, and/or throughput of performing biometric matching against the local gallery versus the main gallery may be greatly improved when it is more likely than not that the digital representations of biometrics corresponding to the biometric matching is stored in the local gallery. If it is not more likely than not that the digital representations of biometrics corresponding to the biometric matching is stored in the local gallery, then performing biometric matching against the local gallery versus the main gallery may frequently end up performing biometric matching against both the local gallery and the main gallery without improving accuracy, latency, and/or throughput. The likelihood that the digital representations of biometrics corresponding to the biometric matching is stored in the local gallery may be greatly improved via biometric gallery management using wireless identifiers.

For example, a biometric station or other device may be able to obtain one or more wireless identifiers that correspond to one or more mobile devices in an area proximate to the biometric station. Presence of such a mobile device in the area proximate to the biometric station may indicate that a person carrying the mobile device may be approaching the biometric station. If a stored digital representation of a biometric associated with the wireless identifier (and thus the mobile device) is loaded into a local gallery upon detection of the wireless identifier, accuracy, latency, and/or throughput of an eventual biometric identification of the person may be improved. In order to facilitate this, associations between mobile identifiers and digital representations of biometrics are generated and stored. For example, mobile identifiers detected as present when a digital representation of a biometric is received may be determined to be associated. Mobile identifiers that are determined to be coincidentally present (i.e., carried not by the person corresponding to the digital representation of the biometric but to another person present while the person corresponding to the digital representation of the biometric provides the digital representation of the biometric) may not be associated, and mobile identifiers that are determined to be associated and are later determined to have been coincidentally present (or are later determined to no longer be associated, are requested to be removed, and so on) may have their associations removed.

The present disclosure relates to biometric gallery management using wireless identifiers. One or more wireless identifiers that correspond to one or more mobile devices (such as smart phones, tablet computing devices, cellular telephones, wearable devices, smart watches, fitness monitors, digital media players, medical devices, and/or other mobile computing devices) that people carry may be associated with digital representations of biometrics corresponding to the people. Wireless identifiers corresponding to mobile devices proximate to a biometric reader device may be monitored. Upon detection of wireless identifiers corresponding to mobile devices proximate to the biometric reader device, the associated digital representations of biometrics may be loaded from a main gallery into one or more local galleries, which may then be used to perform one or more biometric identifications and/or verifications. Associations between digital representations of biometrics and one or more wireless identifiers may be determined, stored, and/or updated using digital representations of biometrics from one or more identifications and/or verifications and wireless identifiers corresponding to one or more mobile devices detected proximate to one or more biometric reader devices.

In this way, accuracy, latency, and/or throughput of biometric matching and/or systems and/or devices that perform such biometric matching may be improved. This may improve operation and/or use fewer resources. As such, the above may enable performance of functions that were previously not performable while expending less work, eliminating unnecessary hardware and/or other components, and more efficiently using hardware, software, network, and/or other resources. This may improve the operation of systems and/or devices involved by reducing unnecessary components, increasing the speed at which the systems and/or devices perform operations, and/or reducing consumption of hardware, software, network, and/or other resources.

These and other embodiments are discussed below with reference to FIGS. 1-13. However, those skilled in the art will readily appreciate that the detailed description given herein with respect to these Figures is for explanatory purposes only and should not be construed as limiting.

FIG. 1 depicts a first example system 100 for biometric gallery management using wireless identifiers. The system 100 may include one or more biometric identification and/or other stations 102 that are operable to communicate with one or more servers 101 and/or server allocations to biometrically identify and/or verify one or more people 106.

The system 100 (such as the station 102, the server 101, and so on) may perform biometric gallery management using wireless identifiers (such as one or more Bluetooth™ identifiers, Bluetooth™ Low Energy or LE identifiers, cellular identifiers, Wi-Fi identifiers, Ethernet identifiers, Near-field communication identifiers, media access control address identifiers, and so on). One or more wireless identifiers that correspond to one or more mobile devices (such as one or more wearable devices 104 and/or user devices 103 like one or more smart phones, tablet computing devices, cellular telephones, smart watches, fitness monitors, digital media players, medical devices, and/or other mobile computing devices) that people 106 carry may be associated with digital representations of biometrics corresponding to the people 106. Wireless identifiers corresponding to mobile devices proximate to the station 102 may be monitored. Upon detection of wireless identifiers corresponding to mobile devices proximate to the station 102, the associated digital representations of biometrics may be loaded from a main gallery into one or more local galleries, which may then be used to perform one or more biometric identifications and/or verifications, such as using one or more cameras 108 and/or other image sensors, fingerprint scanners 109 and/or palm print and/or other scanners, and/or other biometric reader devices of and/or associated with the station 102. Associations between digital representations of biometrics and one or more wireless identifiers may be determined, stored, and/or updated using digital representations of biometrics from one or more identifications and/or verifications and wireless identifiers corresponding to one or more mobile devices detected proximate to the station 102.

In this way, accuracy, latency, and/or throughput of biometric matching and/or the system 100, the server 101, and/or the station 102 may be improved. This may improve operation and/or use fewer resources. As such, the above may enable performance of functions that were previously not performable while expending less work, eliminating unnecessary hardware and/or other components, and more efficiently using hardware, software, network, and/or other resources. This may improve the operation of the system 100, the server 101, and/or the station 102 by reducing unnecessary components, increasing the speed at which the systems and/or devices perform operations, and/or reducing consumption of hardware, software, network, and/or other resources.

In some examples, the local gallery may be stored in a storage device that is faster to access than the main gallery, such as on a more quickly accessible storage device (such as on a memory or cache versus a hard drive or other longer term storage), on a closer device that has less network latency and/or does not require network communication (such as on the station 102 while the main gallery is stored on the server 101), and so on. Alternatively, the local gallery and main gallery may be stored on the same storage device and/or device (such as the station 102 and/or the server 101). Various configurations are possible and contemplated without departing from the present disclosure.

In some examples, biometric matching against the local gallery that is unsuccessful may failover into matching against the main gallery (and/or one or more local galleries where one or more local galleries are created, such as different subsets of the main gallery). Various configurations are possible and contemplated without departing from the present disclosure.

The station 102 may perform one or more biometric identifications and/or verifications at one or more various locations for one or more various purposes. By way of illustration, the station may perform one or more biometric identifications and/or verifications at one or more airports to determine whether or not a person should be allowed access through a security area, a boarding gate, and so on. By way of another illustration, the station may perform one or more biometric identifications and/or verifications at one or more sporting and/or other event venues, buildings, and/or other secured areas to determine whether or not a person has a ticket for and/or should otherwise be allowed access to the sporting and/or other event venue, building, and/or other secured area. In another illustration, the station may perform one or more biometric identifications and/or verifications at one or more merchant locations and/or merchant devices to process one or more payments for one or more transactions. In yet another illustration, the station may perform one or more biometric identifications and/or verifications at various locations in order to attest to information associated with a person, such as whether or not the person is of a particular age, whether or not the person is authorized to perform an action, whether or not the person has a particular vaccination and/or antibody test, whether or not the person has a valid prescription, and so on. Various configurations are possible and contemplated without departing from the present disclosure.

The system 100 (such as the station 102, the server 101, and so on) may determine one or more associations between digital representations of biometrics and one or more wireless identifiers corresponding to one or more mobile devices detected proximate to the station 102 in a variety of different ways. For example, the system 100 may monitor wireless identifiers proximate (such as within a threshold distance, such as 10 feet, 300 feet, and so on) to the station 102 (such as using one or more wireless communication units associated with the station 102, one or more wireless beacons 105 and/or other wireless communication devices disposed near the station 102, and so on). The system 100 may associate detected wireless identifiers with digital representations of biometrics generated and/or otherwise obtained via one or more biometric reader devices of and/or associated with the station 102, such as wireless identifiers detected while the digital representations of biometrics are obtained, wireless identifiers detected within a threshold period of time (such as thirty seconds, one day, and so on) of when the digital representations of biometrics are obtained, and so on.

In some situations, one or more detected wireless identifiers may correspond to one or more mobile devices associated with one or more people 106 providing one or more biometrics to the station 102. In other situations, one or more detected wireless identifiers may correspond to one or more mobile devices associated with people other than the one or more people providing one or more biometrics to the station 102. Regardless, such wireless identifiers and/or other information associated with such detected wireless identifiers may be private information and the system 100 may take steps to protect such information.

By way of example, the system 100 (such as the station 102, the server 101, and so on) may anonymize detected wireless identifiers and/or information associated with such detected wireless identifiers (such as times and/or locations where such information was collected, associated biometric and/or other identity information, frequency of detection, and so on). By way of illustration, detected wireless identifiers and/or information associated with such detected wireless identifiers may be hashed and/or otherwise encrypted and/or protected prior to and/or during storage. In cases where stored detected wireless identifiers are hashed, later detected wireless identifiers may be hashed and the hashed detected wireless identifiers may be compared to the hashed stored wireless identifiers. Various configurations are possible and contemplated without departing from the scope of the present disclosure.

By way of another example, the system 100 (such as the station 102, the server 101, and so on) may be operable to remove detected wireless identifiers and/or information associated with such detected wireless identifiers and/or associations upon request. In such examples, the system 100 may receive a request to remove a wireless identifier and/or information associated with such a wireless identifier, determine whether such a wireless identifier and/or information is associated with such a wireless identifier, and/or remove such a wireless identifier and/or the association and/or other information associated with such a wireless identifier from storage. Various configurations are possible and contemplated without departing from the scope of the present disclosure.

In yet another example, the system 100 (such as the station 102, the server 101, and so on) may include one or more opt in options that allow one or more people (such as the person 106) to opt into storage of one or more wireless identifiers and/or information associated therewith. By way of illustration, the station 102, the beacon 105, and/or another device may emit a signal that may be received by a mobile device (such as the user device 103, the wearable device 104, and so on). The signal may include information usable by the mobile device to provide one or more opt in options (such as a text message, an email, a pop up notification, a web page, and so on) that allows one or more people to opt into the system 100 storing one or more wireless identifiers and/or information associated therewith. Alternatively, the station may present such an opt in option via one or more displays 107 and/or other user interface devices while the person 106 is providing one or more biometrics and so on. In various examples, the mobile device may obtain one or more digital representations of biometrics to provide along with one or more responses to the opt in option. Various configurations are possible and contemplated without departing from the scope of the present disclosure.

In still another example, a person may opt into storage of one or more wireless identifiers and/or information associated therewith via an app or application on a mobile and/or other device (such as the user device 103, the wearable device 104, and so on) that is associated with the system 100, the station 102, the server 101, and so on; through various mechanisms related to one or more accounts maintained by the system 100, the station 102, the server 101, and so on; and/or other mechanisms. Various configurations are possible and contemplated without departing from the scope of the present disclosure.

In yet another example, a person may configure and/or allow an app or application on a mobile and/or other device (such as the user device 103, the wearable device 104, and so on) that is associated with the system 100, the station 102, the server 101, and so on to be configured to detect proximity to the station 102 and/or one or more beacons 105 and/or other wireless devices and provide one or more wireless identifiers and/or other information (such as one or more digital representations of biometrics, account information, and so on) to the system 100, the station 102, the server 101, and so on. Various configurations are possible and contemplated without departing from the scope of the present disclosure.

In various examples, the station 102, the server 101, and/or the beacon 105 may communicate with one or more of the user device 103, the wearable device 104, and/or other mobile devices using one or more of the received wireless identifiers. For example, the station 102, the server 101, and/or the beacon 105 may communicate with one or more of the user device 103, the wearable device 104, and/or other mobile devices to obtain permission to store one or more wireless identifiers, obtain information (such as one or more digital representations of biometrics, identity information associated therewith, and so on), confirm associations between one or more wireless identifiers and one or more digital representations of biometrics, and so on. Various configurations are possible and contemplated without departing from the scope of the present disclosure.

In some examples, the system 100 (such as the station 102, the server 101, and so on) may associate all wireless identifiers that are detected proximate to the station 102 contemporaneous to and/or within a period of time from obtaining of one or more digital representations of biometrics by the station 102. In other examples, the system 100 (such as the station 102, the server 101, and so on) may attempt to determine which of multiple detected wireless identifiers are closest to the station 102 and associate those determined to be closest. For example, the system 100 may determine relative proximity of the multiple detected wireless identifiers according to the time when they were first detected relative to each other by a wireless communication unit associated with the station 102, the beacon 105, and/or another device; by triangulating relative positions using information received by one or more wireless communication units associated with the station 102, the beacon 105, and/or another device; using global positioning system and/or other location system information; and so on. By way of illustration, a number of wireless communication devices may be disposed at various distances from the station 102 and information related to communication between the wireless communication devices and one or more mobile devices corresponding to the multiple detected wireless identifiers may be analyzed to determine respective proximity of the mobile devices as the mobile devices move with respect to the wireless communication devices, each other, and/or the station 102. Various configurations are possible and contemplated without departing from the scope of the present disclosure.

In some examples, the system 100 (such as the station 102, the server 101, and so on) may determine and store associations between one or more wireless identifiers and one or more digital representations of biometrics and use such stored associations without further modification. In other examples, the system 100 (such as the station 102, the server 101, and so on) may subsequently analyze the stored associations in order to modify the stored associations, update the stored associations, improve the accuracy of the stored associations, remove and/or otherwise disassociate one or more of the stored associations, determine that a wireless identifier is actually unassociated with one or more digital representations of biometrics, and so on. Various configurations are possible and contemplated without departing from the scope of the present disclosure.

For example, the system 100 (such as the station 102, the server 101, and so on) may analyze associations to determine that a single wireless identifier is associated with multiple digital representations of biometrics. Under the assumption that one of the associated people may have been present when a mobile device associated with one of the other people was detected, the system 100 may attempt to remove and/or otherwise disassociate one or more of the associations. For example, the system 100 may determine that one of the multiple digital representations of biometrics was determined to be associated with the wireless identifier multiple times while one or more of the others was only determined to be associated once. One or more of the others may be removed and/or otherwise disassociated. Various configurations are possible and contemplated without departing from the scope of the present disclosure.

By way of another example, the system 100 (such as the station 102, the server 101, and so on) may analyze associations to determine that a wireless identifier was only determined to be associated with a digital representations of a biometric once. Under the assumption that multiple detections would occur if a corresponding mobile device is truly associated with an associated person, the system 100 may remove and/or otherwise disassociate the association. In further examples, the system 100 may remove and/or otherwise disassociate the association after a threshold period of time where no further associations are detected (such as one month, one year, and so on), after a threshold number of identifications and/or verifications associated with the digital representations of biometrics are performed (such as one, ten, and so on), and/or the occurrence of one or more other conditions. Various configurations are possible and contemplated without departing from the scope of the present disclosure.

In other examples, the systems 100 (such as the station 102, the server 101, and so on) may analyze associations and remove and/or otherwise disassociate one or more for a variety of different reasons. Such reasons may include the elapse of a threshold period of time where no further associations are detected (such as one month, one year, and so on), performance of a threshold number of identifications and/or verifications associated with the digital representations of biometrics (such as one, ten, and so on) without subsequent determination of association with the wireless identifiers, and so on. Various configurations are possible and contemplated without departing from the scope of the present disclosure.

Although the system 100 is illustrated and described with respect to a particular configuration, it is understood that this is an example. By way of illustration, the system 100 is illustrated and described as including both the station 102 and the server 101. However, in some implementations, the station 102 and the server 101 may be combined. Various configurations are possible and contemplated without departing from the scope of the present disclosure.

By way of another illustration, the above illustrates and describes the system 100 as including the beacon 105. However, it is understood that this is an example. In other implementations, the beacon 105 may be omitted. Various configurations are possible and contemplated without departing from the scope of the present disclosure.

In still another example, the station 102 is illustrated and described as including the display 107, the camera 108, and the fingerprint scanner 109. However, it is understood that this is an example. In other implementations, any biometric reader devices and/or other components may be included or not included. Various configurations are possible and contemplated without departing from the scope of the present disclosure.

By way of yet another example, the system 100 is illustrated and described above as performing biometric gallery management based on detecting one or more wireless identifiers corresponding to one or more mobile devices. However, it is understood that this is an example. In other implementations, the system 100 may perform biometric gallery management using techniques other than detecting one or more wireless identifiers corresponding to one or more mobile devices without departing from the scope of the present disclosure.

By way of illustration, in some implementations, the system 100 may perform biometric gallery management using information in an app or application executing on a mobile device or other electronic device. By way of example, a person may use the app or application executing on the mobile device or other electronic device to check in for a flight, hotel reservation, rental vehicle registration, and/or other item for which a person may check in. The app or application may be associated with the system 100 (such as directly, via another app or application executing on mobile device or other electronic device that is linked to the app or application, and so on) and may notify the system 100 (such by communicating with the server 101 and/or another device) that the person has checked in for the flight, hotel reservation, rental vehicle registration, and/or other item. In response, the system 100 (such as via the server 101, the station 102, and so on) may determine a location associated with the flight, hotel reservation, rental vehicle registration, and/or other item, determine one or more stations 102 associated with the location, and load one or more digital representations of biometrics associated with the person from a main gallery into one or more local galleries, which may then be used to perform one or more biometric identifications and/or verifications.

In various other implementations, the app or application may access location information for the mobile device or other electronic device and notify the system 100 of such, which the system 100 (such as via the server 101, the station 102, and so on) may use to determine one or more associated stations 102 for which to load one or more digital representations of biometrics associated with the person from the main gallery into the one or more local galleries rather than doing so based on a determination of a location associated with the flight, hotel reservation, rental vehicle registration, and/or other item. In still other implementations, the app or application may not be an app or application that person uses to check in for a flight, hotel reservation, rental vehicle registration, and/or other item but may instead be an app or application that monitors another app or application that the person does use to check in for a flight, hotel reservation, rental vehicle registration, and/or other item and the monitoring app or application may notify the system 100 (such by communicating with the server 101 and/or another device) based thereon. Various configurations are possible and contemplated without departing from the scope of the present disclosure.

By way of another example, rather than an app or application that person uses to check in for a flight, hotel reservation, rental vehicle registration, and/or other item, in some implementations, the app or application executing on the mobile device or other electronic device may be an app or application that the person uses for various other purposes (such as providing a payment by providing one or more digital representations of one or more biometrics that are used to access associated payment information, providing health-related or other access authorization proof providing one or more digital representations of one or more biometrics that are used to access information related to whether or not the person should be provided access, accessing information tailored for the person provided in response to providing one or more digital representations of one or more biometrics that are used to tailor the information for the person, and so on). When the person uses the app or application, the app or application may access location information for the mobile device or other electronic device and notify the system 100 of the app or application use and the location information, which the system 100 (such as via the server 101, the station 102, and so on) may use to determine one or more associated stations 102 for which to load one or more digital representations of biometrics associated with the person from the main gallery into the one or more local galleries.

In various other implementations, the system 100 may determine a location using notice of the use received from the app or application rather than the app or application communicating location information accessed from the mobile device or other electronic device. In still other implementations, the app or application may not be an app or application that person uses but may instead be an app or application that monitors another app or application that the person does use and the monitoring app or application may notify the system 100 (such by communicating with the server 101 and/or another device) based thereon. Various configurations are possible and contemplated without departing from the scope of the present disclosure.

Figure 2:
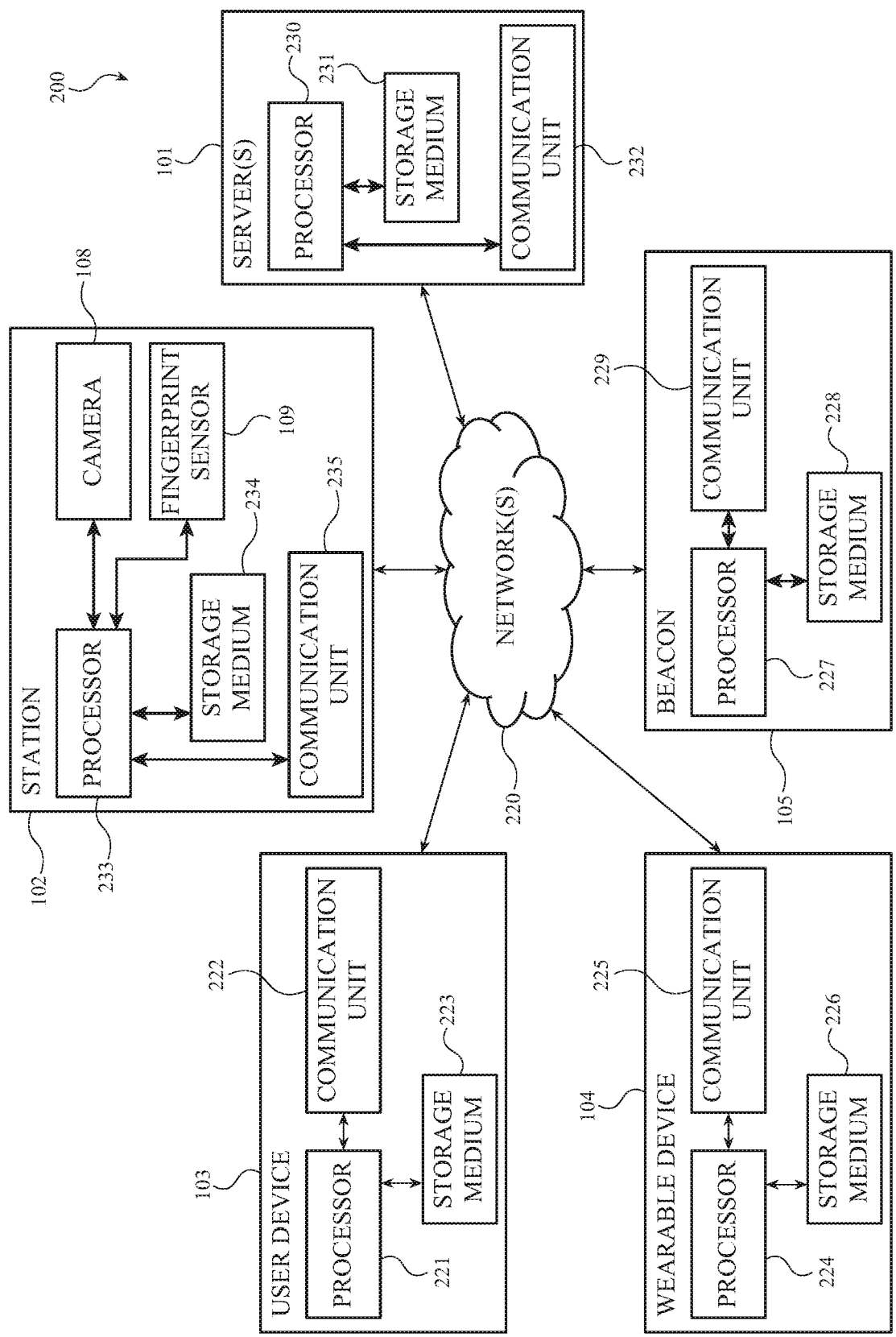
FIG. 2 depicts a system of example relationships between example components that may be used to implement the first example system of FIG. 1.

FIG. 2 depicts a system 200 of example relationships between example components that may be used to implement the first example system 100 of FIG. 1. As shown, the server 101, the station 102, the beacon 105, the user device 103, and/or the wearable device 104 may be communicably connected via one or more wired and/or wireless networks.

The server 101 may store identity information (such as one or more names, addresses, telephone numbers, social security numbers, patient identification numbers or other identifiers, insurance data, financial data, health information (such as one or more temperatures, pupil dilation, medical diagnoses, immunocompromised conditions, medical histories, medical records, infection statuses, vaccinations, immunology data, results of antibody tests evidencing that a person has had a particular communicable illness and recovered, blood test results, saliva test results, and/or the like), and so on associated with the identities of people (which may be verified identities, where the identities are verified as corresponding to the particular person named and/or where the identity information is verified as valid). Alternatively and/or additionally, some or all of the health information may be stored separately from the identity information but otherwise associated with the identity information, such as in a Health Insurance Portability and Accountability Act ("HIPAA") compliant or other data store or enclave. Such a data store or enclave may be stored on one or more different storage media than the identity information, or may be stored on the same storage medium or media and logically isolated from the identity information. The health information may be simultaneously and/or substantially simultaneously accessible as the identity information, such as where the identity information includes a health information identifier or key that may be used to access the separately stored health information. The identity system device may control access to the identity information and/or the health information using identification information that is associated with the identity information. The identification information may include digital representations of biometrics and/or other biometric information or biometric data (which may include one or more digital representations of one or more fingerprints, palm prints, blood vessel scans, palm-vein scans, voice prints, facial images, retina images, iris images, deoxyribonucleic acid sequences, heart rhythms, gaits, and so on), one or more logins and/or passwords, authorization tokens, social media and/or other accounts, and so on. In various implementations, the server 101 may allow the person associated with an identity to control access to the identity information, the health information, and/or other information (such as payment account information, health information (such as medical records, HIPAA protected information in order to be compliant with various legal restrictions, and so on), contact information, and so on. The server 101 may control access to such information according to input received from the person. The server may be operable to communicate with the station 102 in order to handle requests to provide the identity information and/or the health information, update and/or otherwise add to the identity information and/or the health information, provide attestations regarding and/or related to the identity information and/or the health information (such as whether or not a person is of a particular age, whether or not a person has a particular license or insurance policy, whether or not a person has been monitored as having particular health information, whether or not a person has had a particular vaccination, whether or not an antibody test evidences that a person has had a particular communicable illness and recovered, whether or not a person has a particular ticket or authorization, whether or not a person has been monitored as having particular antibodies, whether or not a person has been assigned a particular medical diagnosis, and so on), evaluate health information stored in the identity information and/or otherwise associated with the identity information and/or other information stored in the identity information, perform transactions, allow or deny access, route one or more persons, and/or perform one or more other actions.

The server 101 may be any kind of electronic device and/or cloud and/or other computing arrangement. Examples of such devices include, but are not limited to, one or more desktop computing devices, laptop computing devices, mobile computing devices, wearable devices, tablet computing devices, mobile telephones, kiosks and/or other stations, smart phones, printers, displays, vehicles, kitchen appliances, entertainment system devices, digital media players, and so on. The server 101 may include one or more processors 230 and/or other processing units or controllers, communication units 232, non-transitory storage media 231 (which may take the form of, but is not limited to, a magnetic storage medium; optical storage medium; magneto-optical storage medium; read only memory; random access memory; erasable programmable memory; flash memory; and so on), and/or other components. The processor 230 may execute one or more sets of instructions stored in the non-transitory storage medium 231 to perform various functions, such as receiving and/or storing digital representations of biometrics and/or other biometric information and/or other identification information, receiving and/or storing identity information and/or health information, matching one or more received digital representations of biometrics and/or other identification information to stored data, retrieving identity information and/or health information associated with stored data matching one or more received digital representations of biometrics and/or other identification information, providing retrieved identity information and/or health information, maintaining one or more galleries (such as a main gallery and/or one or more local galleries stored by the server 101, the station 102, and so on) communicating with the station 102 via the network 220 using the communication unit 232, and so on. Alternatively and/or additionally, the server 101 may involve one or more memory allocations configured to store at least one executable asset and one or more processor allocations configured to access the one or more memory allocations and execute the at least one executable asset to instantiate one or more processes and/or services, such as one or more gallery management services, biometric identifications services, and so on. Various configurations are possible and contemplated without departing from the scope of the present disclosure.

Similarly, the station 102 may be any kind of device. The electronic device may include one or more processors 233 and/or other processing units and/or controllers, one or more non-transitory storage media 234, one or more communication units 235, one or more displays (such as the display 107 shown in FIG. 1), one or more health sensors (such as a thermometer and/or other thermal sensor, a blood pressure sensor, a blood test sensor, a blood vessel scanner, a palm-vein scanner, a still image and/or video camera, a 2D and/or 3D image sensor, a saliva sensor, breath sensor, a deoxyribonucleic acid sensor, a heart rhythm monitor, a microphone, sweat sensors, and so on), one or more biometric readers (such as the fingerprint scanner 109, a blood vessel scanner, a palm-vein scanner, an optical fingerprint scanner, a phosphorescent fingerprint scanner), the camera 108 (which may be a still image and/or video camera), a 2D and/or 3D image sensor, a capacitive sensor, a saliva sensor, a deoxyribonucleic acid sensor, a heart rhythm monitor, a microphone, and so on), and/or one or more other components. The processor may execute one or more sets of instructions stored in the non-transitory storage media to perform various functions, such as using the biometric reader to obtain one or more digital representations of one or more biometrics (such as a digital representation of a fingerprint, a blood vessel scan, a palm-vein scan, a voiceprint, a facial image, a retina image, an iris image, a deoxyribonucleic acid sequence, a heart rhythm, a gait, and so on) for a person, obtain health information for a person using the health sensor, communicate with the server 101 via the network using the communication unit, and so on. Various configurations are possible and contemplated without departing from the scope of the present disclosure.

Likewise, the beacon 105 may include one or more processors 227, communication units 229, non-transitory storage media 228 and/or other components; the user device 103 may include one or more processors 221, communication units 222, non-transitory storage media 223 and/or other components; and the wearable device 104 may include one or more processors 224, communication units 225, non-transitory storage media 226 and/or other components. Various configurations are possible and contemplated without departing from the scope of the present disclosure.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Example information can include, but may not be limited to: personal identification information (e.g., names, social security numbers, telephone numbers, email addresses, physical addresses, driver's license information, passport numbers, and so on); identity documents (e.g., drivers licenses, passports, government identification cards or credentials, and so on); protected health information (e.g., medical records, dental records, and so on); financial, banking, credit, or debt information; third-party service account information (e.g., usernames, passwords, social media handles, and so on); encrypted or unencrypted files; database files; network connection logs; shell history; filesystem files; libraries, frameworks, and binaries; registry entries; settings files; executing processes; hardware vendors, versions, and/ or information associated with the compromised computing resource; installed applications or services; password hashes; idle time, uptime, and/or last login time; document files; product renderings; presentation files; image files; customer information; configuration files; passwords; and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Figure 3:
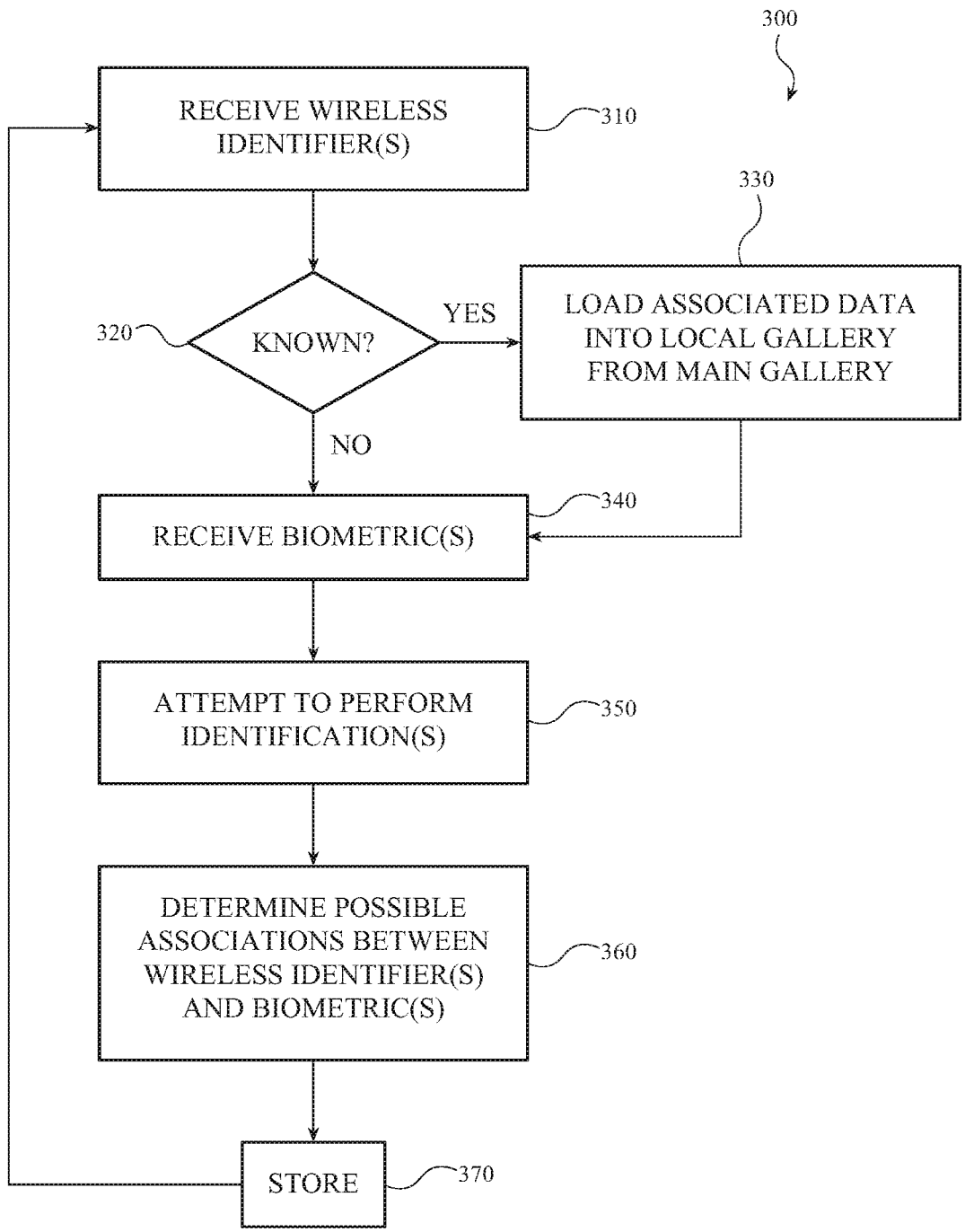
FIG. 3 depicts a first example method for biometric gallery management using wireless identifiers. This first example method may be performed by the systems of FIGS. 1, 2, 8, and/or 9.

FIG. 3 depicts a first example method 300 for biometric gallery management using wireless identifiers. This first example method 300 may be performed by the systems 100, 200, 800, 900 of FIGS. 1, 2, 8, and/or 9.

At operation 310, an electronic device (such as the station 102 of FIG. 1, the server 101 of FIG. 1, and so on) may receive one or more wireless identifiers (such as one or more Bluetooth™ identifiers, Bluetooth™ Low Energy or LE identifiers, cellular identifiers, Wi-Fi identifiers, Ethernet identifiers, Near-field communication identifiers, media access control address identifiers, and so on). At operation 320, the electronic device may determine whether or not the one or more wireless identifiers are known. For example, the electronic device may compare the one or more wireless identifiers against one or more stored associations between wireless identifiers and one or more digital representations of biometrics (such as one or more digital representations of one or more fingerprints, palm prints, blood vessel scans, palm-vein scans, voice prints, facial images, retina images, iris images, deoxyribonucleic acid sequences, heart rhythms, gaits, and so on) that correspond to one or more identities. If so, the flow may proceed to operation 330 where the electronic device may load data (such as the digital representations of biometrics) associated with the one or more wireless identifiers into a local gallery from a main gallery before the flow may proceed to operation 340. Otherwise, the flow may proceed to operation 340 directly.

At operation 340, the electronic device may receive one or more digital representations of biometrics (such as one or more digital representations of one or more fingerprints, palm prints, blood vessel scans, palm-vein scans, voice prints, facial images, retina images, iris images, deoxyribonucleic acid sequences, heart rhythms, gaits, and so on). At operation 350, the electronic device may attempt to perform one or more biometric identifications and/or verifications.

For example, the electronic device may first attempt to perform a biometric identification using the local gallery. If the identification using the local gallery fails, the electronic device may attempt to perform the identification using the main gallery. Various configurations are possible and contemplated without departing from the scope of the present disclosure.

At operation 360, the electronic device may determine possible associations between the wireless identifier and the digital representation of the biometric. For example, the electronic device may monitor wireless identifiers proximate (such as within a threshold distance, such as 10 feet, 300 feet, and so on) to a station (such as using one or more wireless communication units associated with the station, one or more wireless beacons and/or other wireless communication devices disposed near the station, and so on). The electronic device may associate detected wireless identifiers with digital representations of biometrics obtained via one or more biometric reader devices of and/or associated with the station, such as wireless identifiers detected while the digital representations of biometrics are obtained, wireless identifiers detected within a threshold period of time (such as thirty seconds, one day, and so on) of when the digital representations of biometrics are obtained, and so on. At operation 370, the electronic device may store such an association if one is determined.

The flow may then return to operation 310 where the electronic device may again receive one or more wireless identifiers.

By way of example, a server may receive a wireless identifier obtained by a station and/or another electronic device proximate to the station. The server may determine whether or not the wireless identifier is known, load associated data into a local gallery (which may be stored at the station, at the server, and so on) from a main gallery if the wireless identifier is known, receive a digital representation of a biometric, attempt to perform an identification using the local gallery, attempt to perform the identification using the main gallery if identification using the local gallery fails, determine possible associations between the wireless identifier and the digital representation of the biometric, and store such an association if one is determined.

By way of another example, a station may receive a wireless identifier using a communication unit and/or another electronic device proximate to the station. The station may determine whether or not the wireless identifier is known (such as by transmitting the wireless identifier to a server), load associated data (such as by communicating with the server to obtain and/or otherwise appropriately load the associated data) into a local gallery (which may be stored at the station, at the server, and so on) from a main gallery if the wireless identifier is known, receive a digital representation of a biometric, attempt to perform an identification using the local gallery (such as by comparing the digital representation of the biometric to the local gallery and/or transmitting the digital representation of the biometric to the server for comparison), attempt to perform the identification using the main gallery if identification using the local gallery fails (such as by comparing the digital representation of the biometric to the local gallery and/or transmitting the digital representation of the biometric to the server for comparison), determine possible associations between the wireless identifier and the digital representation of the biometric, and store such an association if one is determined.

In various examples, this example method 300 may be implemented using a group of interrelated software modules or components that perform various functions discussed herein. These software modules or components may be executed within a cloud network and/or by one or more computing devices, such as the server 101 of FIG. 1.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as loading data associated with detected wireless identifiers into a local gallery, attempting to perform biometric identifications, and storing associations between wireless identifiers and biometrics. However, it is understood that this is an example. In various implementations, one or more of these functions may be omitted and/or performed by other devices and/or systems. Various configurations are possible and contemplated without departing from the scope of the present disclosure.

Figure 4:
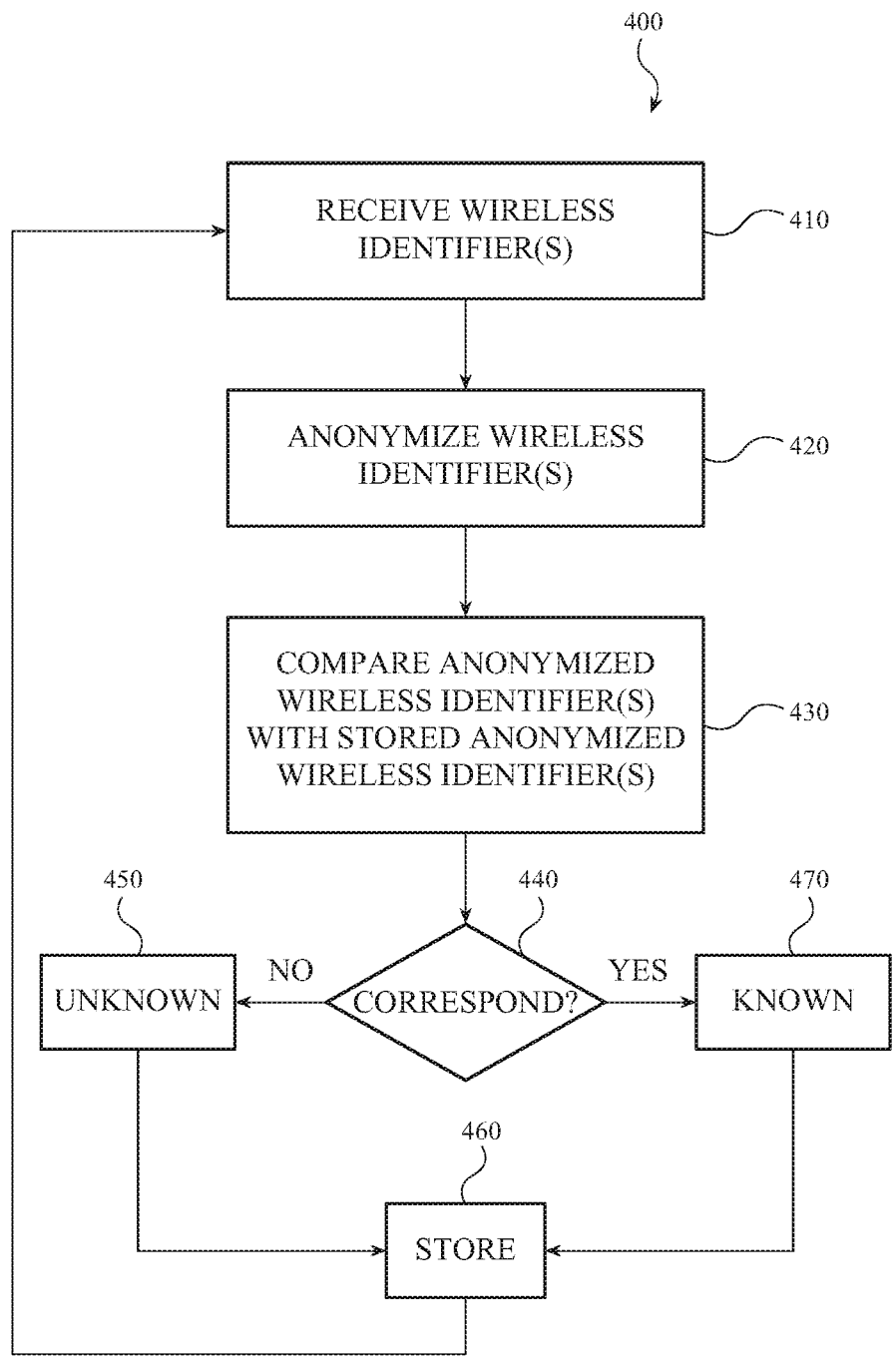
FIG. 4 depicts a second example method for biometric gallery management using wireless identifiers. This second example method may be performed by the systems of FIGS. 1, 2, 8, and/or 9.

FIG. 4 depicts a second example method 400 for biometric gallery management using wireless identifiers. This second example method 400 may be performed by the systems 100, 200, 800, 900 of FIGS. 1, 2, 8, and/or 9.

At operation 410, an electronic device (such as the station 102 of FIG. 1, the server 101 of FIG. 1, and so on) may receive one or more wireless identifiers. At operation 420, the electronic device may anonymize the wireless identifier, such as by hashing the wireless identifier. At operation 430, the electronic device may compare the anonymized wireless identifier with one or more stored anonymized wireless identifiers (such as stored hashed wireless identifiers).

At operation 440, the electronic device may determine whether or not there is a correspondence between the anonymized wireless identifier and the one or more stored anonymized wireless identifiers. If not, the electronic device may determine that the wireless identifiers is unknown at operation 450 before the flow may proceed to operation 460 where the electronic device may store the anonymized wireless identifier (and/or one or more associations between the anonymized wireless identifier and other information, such as digital representations of biometrics). Otherwise, the electronic device may determine that the wireless identifier is known at operation 470 before the flow may proceed to operation 460 where the electronic device may store the anonymized wireless identifier (and/or one or more associations between the anonymized wireless identifier and other information, such as digital representations of biometrics).

In various examples, this example method 400 may be implemented using a group of interrelated software modules or components that perform various functions discussed herein. These software modules or components may be executed within a cloud network and/or by one or more computing devices, such as the server 101 of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 may include the additional operation of loading data associated with a wireless identifier into a local gallery from a main gallery upon determining that the wireless identifier is known at operation 470. Various configurations are possible and contemplated without departing from the scope of the present disclosure.

Figure 5:
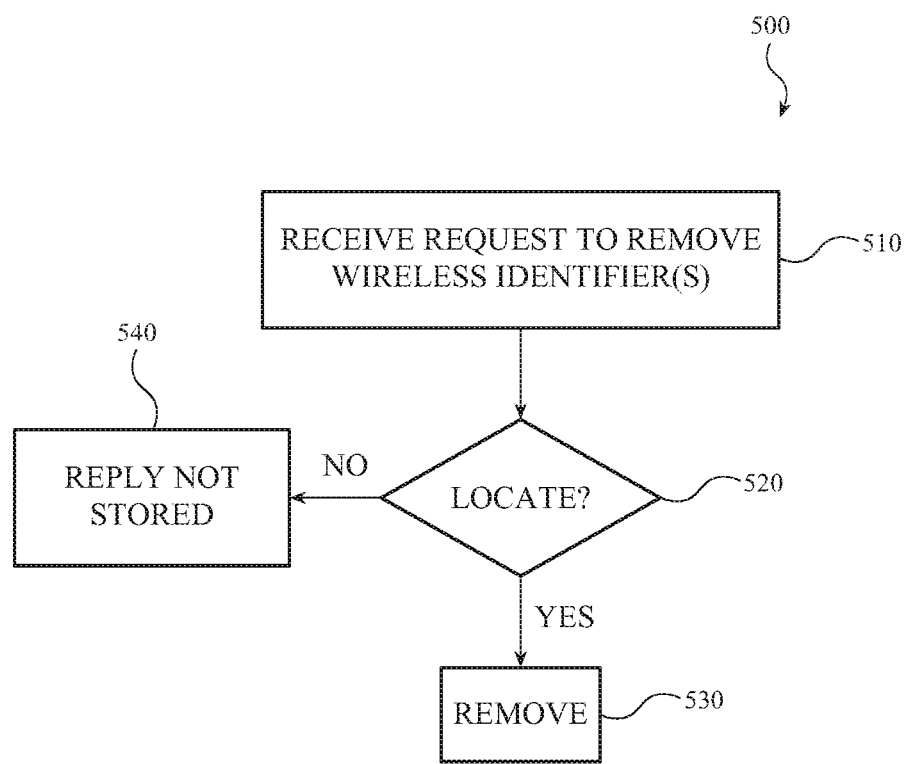
FIG. 5 depicts a third example method for biometric gallery management using wireless identifiers. This third example method may be performed by the systems of FIGS. 1, 2, 8, and/or 9.

FIG. 5 depicts a third example method 500 for biometric gallery management using wireless identifiers. This third example method 500 may be performed by the systems 100, 200, 800, 900 of FIGS. 1, 2, 8, and/or 9.

At operation 510, an electronic device (such as the station 102 of FIG. 1, the server 101 of FIG. 1, and so on) may receive one or more requests to remove one or more wireless identifiers and/or associations and/or associated information from a storage. Such a storage may maintain one or more associations between stored wireless identifiers and other data, such as digital representations of biometrics. The flow may then proceed to operation 520.

At operation 520, the electronic device may determine whether or not the wireless identifier requested for removal can be located in the storage. If so, the flow may proceed to operation 530 where the electronic device removes the wireless identifier and/or the association from the storage. Otherwise, the flow may proceed to operation 540 where the electronic device may reply that the wireless identifier is not stored.

In various examples, this example method 500 may be implemented using a group of interrelated software modules or components that perform various functions discussed herein. These software modules or components may be executed within a cloud network and/or by one or more computing devices, such as the server 101 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, operation 540 is illustrated and described as replying when the wireless identifier cannot be located in the storage. However, it is understood that this is an example. In various implementations, the electronic device may not provide any information regarding whether or not a particular wireless identifier is stored, though the electronic device may remove the wireless identifier and/or the association upon request. Various configurations are possible and contemplated without departing from the scope of the present disclosure.

By way of another example, the method 500 is illustrated and described as the electronic device removing the wireless identifier from the storage. However, it is understood that this is an example. In other implementations, the electronic device may instead instruct another device to remove the wireless identifier and/or the association from the storage. Various configurations are possible and contemplated without departing from the scope of the present disclosure.

Figure 6:
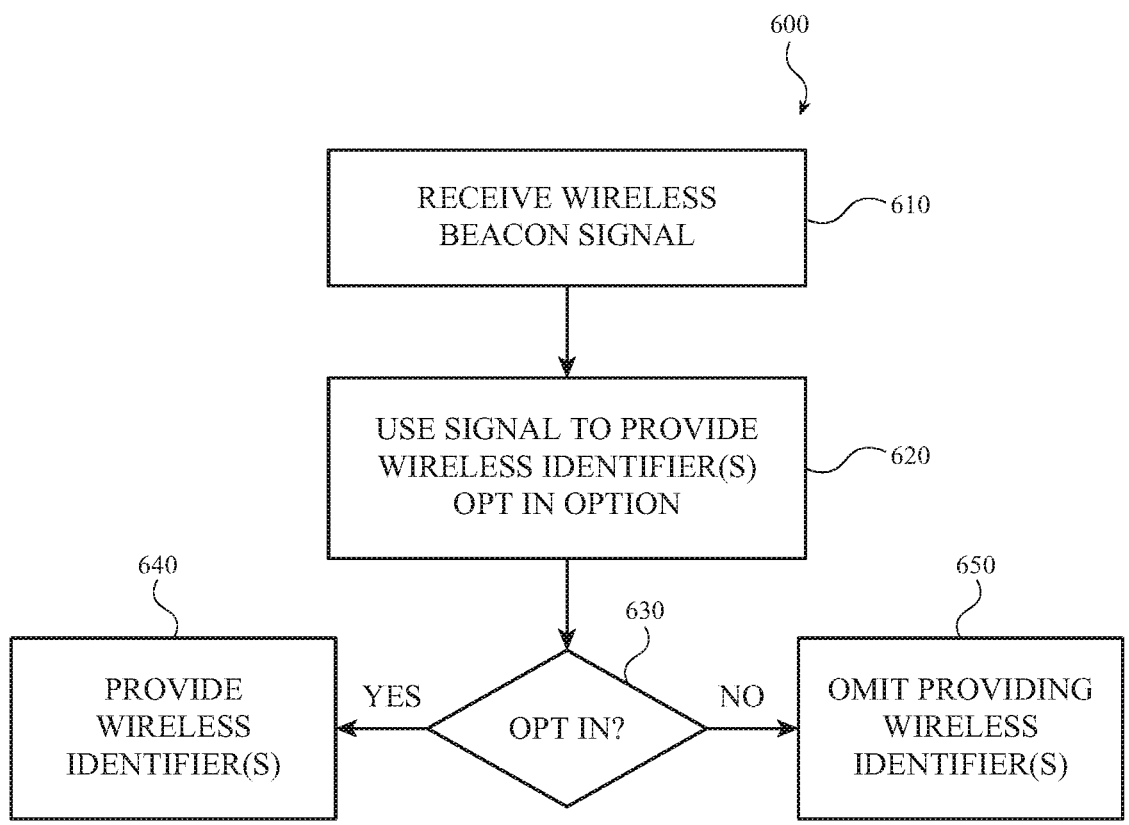
FIG. 6 depicts a fourth example method for biometric gallery management using wireless identifiers. This fourth example method may be performed by the systems of FIGS. 1, 2, 8, and/or 9.

FIG. 6 depicts a fourth example method 600 for biometric gallery management using wireless identifiers. This fourth example method 600 may be performed by the systems 100, 200, 800, 900 of FIGS. 1, 2, 8, and/or 9.

At operation 610, an electronic device (such as the user device 103, the wearable device 104, and so on) may receive one or more wireless beacon signals. The one or more wireless beacon signals may be received from one or more wireless beacons and/or other wireless communication devices included within and/or positioned proximate to one or more biometric identification stations.

At operation 620, the electronic device may use the signal to provide one or more wireless identifiers opt in options. For example, the signal may cause the electronic device to present a web page that presents an option to opt in to providing one or more wireless identifiers associated with the electronic device to one or more systems or devices. By way of another example, the signal may cause the electronic device to launch an app or application that presents an option to opt in to providing one or more wireless identifiers associated with the electronic device to one or more systems or devices that are associated with the app or application.

At operation 630, the electronic device may determine whether or not the option to opt in is selected, such as by a user of the electronic device. If so, the electronic device may provide the one or more wireless identifiers at operation 640. Otherwise, the electronic device may omit providing the one or more wireless identifiers at operation 650.

In various examples, this example method 600 may be implemented using a group of interrelated software modules or components that perform various functions discussed herein. These software modules or components may be executed within a cloud network and/or by one or more computing devices, such as the server 101 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as both providing the option to opt in and determining whether or not the option to opt in is selected. However, it is understood that this is an example. In other implementations, the electronic device may perform one of these operations while one or more other devices or systems perform the other. Various configurations are possible and contemplated without departing from the scope of the present disclosure.

Figure 7:
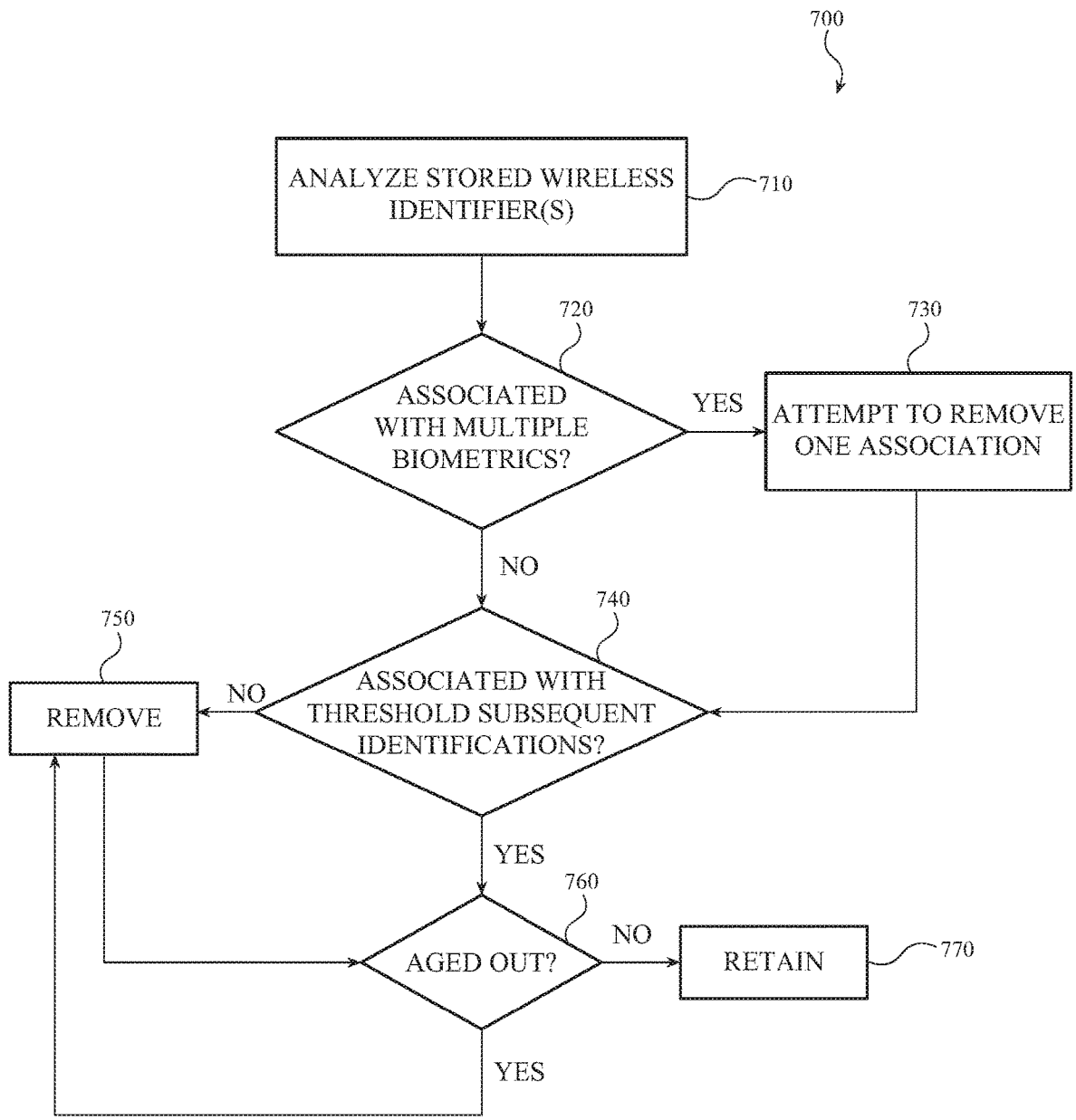
FIG. 7 depicts a fifth example method for biometric gallery management using wireless identifiers. This fifth example method may be performed by the systems of FIGS. 1, 2, 8, and/or 9.

FIG. 7 depicts a fifth example method 700 for biometric gallery management using wireless identifiers. This fifth example method 700 may be performed by the systems 100, 200, 800, 900 of FIGS. 1, 2, 8, and/or 9.

At operation 710, an electronic device (such as the station 102 of FIG. 1, the server 101 of FIG. 1, and so on) may analyze one or more stored wireless identifiers. At operation 720, the electronic device may determine whether or not one or more stored wireless identifiers are associated with multiple digital representations of biometrics. If so, this may mean that one or more of the associations may have been made in error and the flow may proceed to operation 730 where the electronic device attempts to remove and/or otherwise disassociate one or more of the associations before the flow proceeds to operation 740. Otherwise, the flow may proceed directly to operation 740.

At operation 740, the electronic device may determine whether or not one or more stored wireless identifiers are associated with a threshold number of subsequent biometric identifications (such as one, ten, and so on). If not, this may mean that one or more of the associations may have been made in error and the flow may proceed to operation 750 where the electronic device may remove and/or otherwise disassociate one or more of the associations before the flow proceeds to operation 760. Otherwise, the flow may proceed directly to operation 760.

At operation 760, the electronic device may determine whether or not one or more stored wireless identifier associations have aged out. The one or more stored wireless identifier associations have aged out if a subsequent association has not been stored within a threshold period of time (such as one month, one year, and so on). If so, this may mean that one or more of the associations may have been made in error and/or may no longer be valid and the flow may proceed to operation 750 where the electronic device may remove and/or otherwise disassociate one or more of the associations before the flow may end. Otherwise, the flow may proceed to operation 770 where the electronic device may determine to retain the one or more stored wireless identifier associations before the flow may end.

In various examples, this example method 700 may be implemented using a group of interrelated software modules or components that perform various functions discussed herein. These software modules or components may be executed within a cloud network and/or by one or more computing devices, such as the server 101 of FIG. 1.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as including operations 710-730, 740-750, and 760-770. However, it is understood that this is an example. In various implementations, one or more of these operations may be omitted and/or performed by one or more other systems and/or devices. Various configurations are possible and contemplated without departing from the scope of the present disclosure.

By way of another example, the method 700 may include additional operations for determining and/or removing one or more erroneously determined and/or no longer valid associations related to one or more wireless identifiers. Various configurations are possible and contemplated without departing from the scope of the present disclosure.

Figure 8:
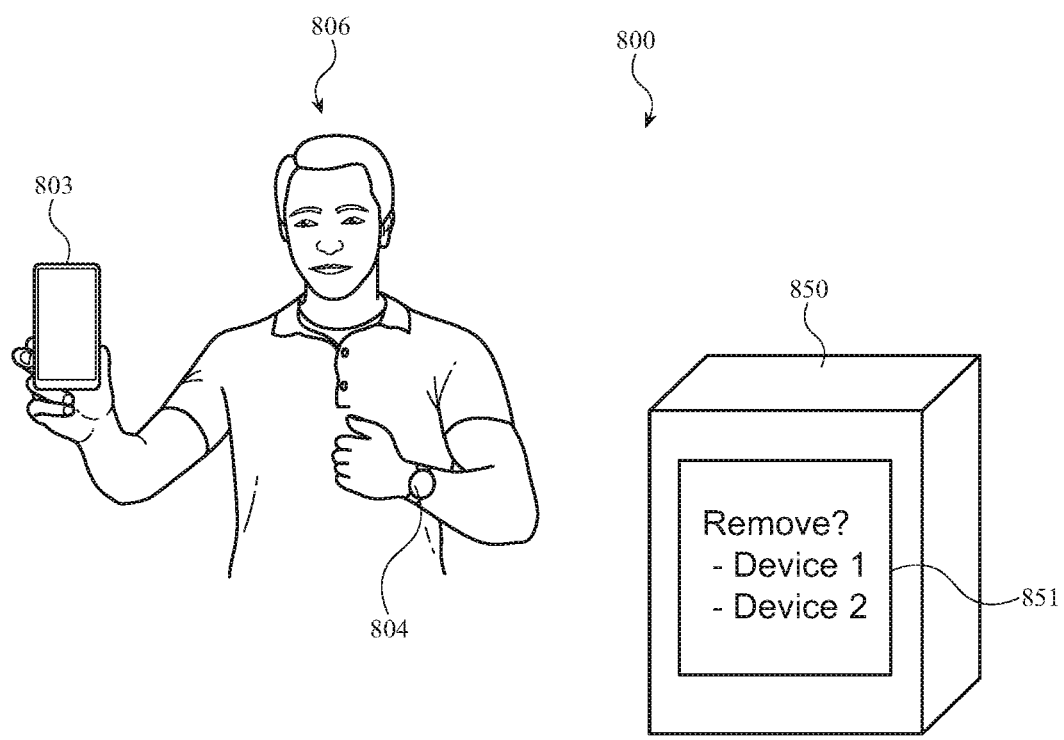
FIG. 8 depicts a second example system for biometric gallery management using wireless identifiers.

FIG. 8 depicts a second example system 800 for biometric gallery management using wireless identifiers. This system 800 may include a device 850 where a person 806 may request that one or more wireless identifiers and/or associations be removed and/or otherwise disassociated from storage. The device 850 may perform the method 500 of FIG. 5, communicate with one or more devices that perform the method 500 of FIG. 5, and so on. Various configurations are possible and contemplated without departing from the scope of the present disclosure.

By way of illustration, the device 850 may detect a user device 803, a wearable device 804, and/or one or more other devices that the person is carrying and/or that are proximate. The device 850 may present information related to the user device 803, the wearable device 804, and/or one or more other devices on a display 851 and/or other user interface and the person 806 may be able to select that the device 850 remove and/or otherwise disassociate one or more wireless identifiers and/or associations related to the user device 803, the wearable device 804, and/or one or more other devices from storage. Various configurations are possible and contemplated without departing from the scope of the present disclosure.

In another example, the device 850 may not detect the user device 803, the wearable device 804, and/or one or more other devices. Instead, the person 806 may provide information regarding the user device 803, the wearable device 804, and/or one or more other devices to the device 850. Various configurations are possible and contemplated without departing from the scope of the present disclosure.

Figure 9:
FIG. 9 depicts a third example system for biometric gallery management using wireless identifiers.

FIG. 9 depicts a second example system 900 for biometric gallery management using wireless identifiers. This system 900 may include a user device 903 that is operable to present an opt in option to opt into storage of one or more wireless identifiers and/or information associated therewith. In some examples, the user device 903 may provide the opt in option in response to one or more signals received from one or more wireless beacons and/or other wireless communication devices. In various examples, the user device 903 may perform the method 600 of FIG. 6, communicate with one or more devices that perform the method 600 of FIG. 6, and so on. Various configurations are possible and contemplated without departing from the scope of the present disclosure.

Figure 10:
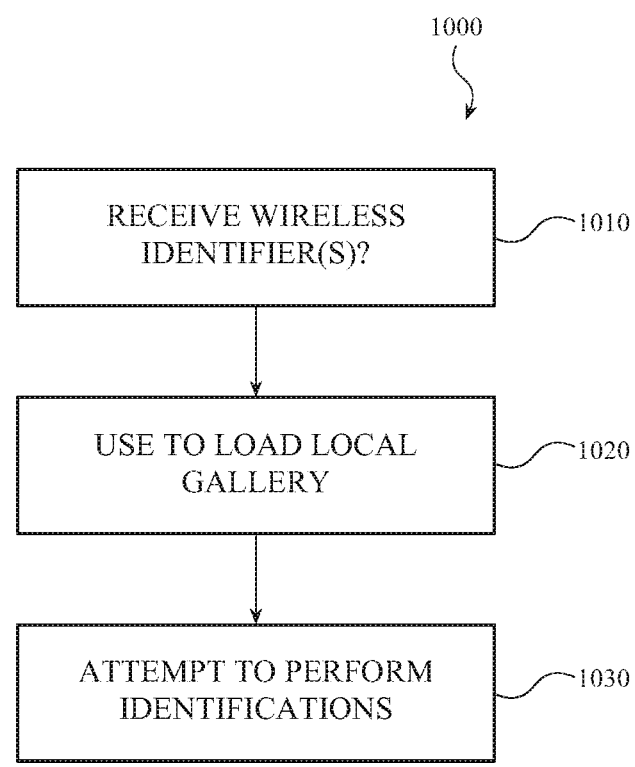
FIG. 10 depicts a sixth example method for biometric gallery management using wireless identifiers. This sixth example method may be performed by the systems of FIGS. 1, 2, 8, and/or 9.

FIG. 10 depicts a sixth example method 1000 for biometric gallery management using wireless identifiers. This sixth example method 1000 may be performed by the systems 100, 200, 800, 900 of FIGS. 1, 2, 8, and/or 9.

At operation 1010, an electronic device (such as the station 102 of FIG. 1, the server 101 of FIG. 1, and so on) may receive one or more wireless identifiers. At operation 1020, the electronic device may use the one or more wireless identifiers to load one or more local galleries. For example, the electronic device may use the one or more wireless identifiers to load one or more local galleries from a main gallery. At operation 1030, the electronic device may attempt to perform one or more biometric identifications using the local gallery In various examples, this example method 1000 may be implemented using a group of interrelated software modules or components that perform various functions discussed herein. These software modules or components may be executed within a cloud network and/or by one or more computing devices, such as the server 101 of FIG. 1.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 is illustrated and described as including operations 1010-1020 and operation 1030. However, it is understood that this in an example. In various implementations, one or more of these operations may be omitted and/or performed by one or more other devices and/or systems. Various configurations are possible and contemplated without departing from the scope of the present disclosure.

Figure 11:
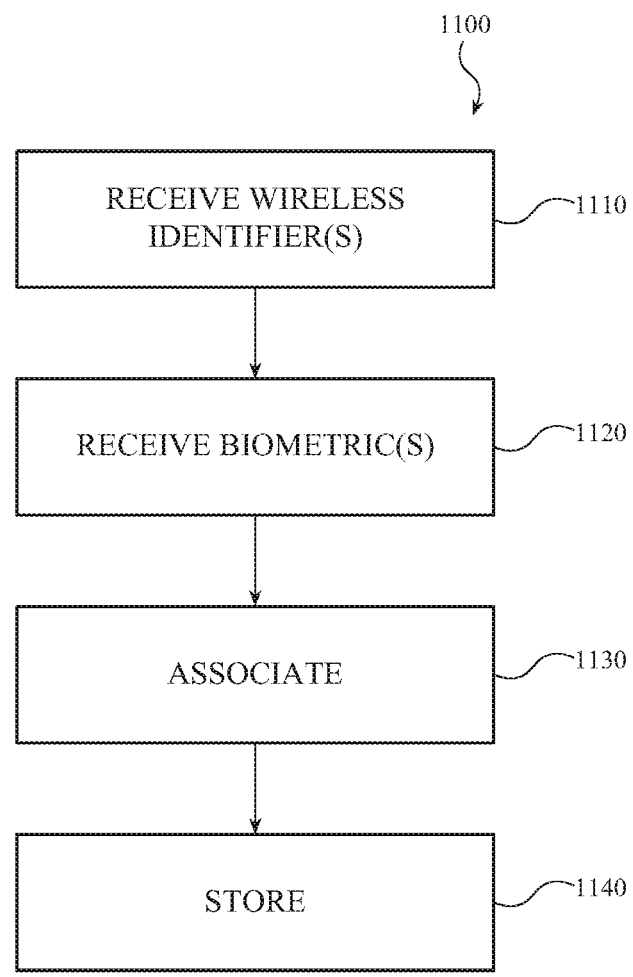
FIG. 11 depicts a seventh example method for biometric gallery management using wireless identifiers. This seventh example method may be performed by the systems of FIGS. 1, 2, 8, and/or 9.

FIG. 11 depicts a seventh example method 1100 for biometric gallery management using wireless identifiers. This seventh example method 1100 may be performed by the systems 100, 200, 800, 900 of FIGS. 1, 2, 8, and/or 9.

At operation 1110, an electronic device (such as the station 102 of FIG. 1, the server 101 of FIG. 1, and so on) may receive one or more wireless identifiers. At operation 1120, the electronic device may receive one or more digital representations of one or more biometrics. For example, the electronic device may receive the one or more digital representations of the one or more biometrics as part of performing one or more biometric identifications and/or verifications. By way of another example, the electronic device may receive the one or more digital representations of the one or more biometrics as part of associating the one or more digital representations of the one or more biometrics with the one or more wireless identifiers (such as when the one or more digital representations of the one or more biometrics are received from an app or application executing on a mobile device that is operable to associate the one or more digital representations of the one or more biometrics with one or more wireless identifiers associated with the mobile device).

At operation 1130, the electronic device may associate the one or more digital representations of the one or more biometrics with the one or more wireless identifiers. The flow may then proceed to operation 1140 where the electronic device may store the one or more associations.

In various examples, this example method 1100 may be implemented using a group of interrelated software modules or components that perform various functions discussed herein. These software modules or components may be executed within a cloud network and/or by one or more computing devices, such as the server 101 of FIG. 1.

Although the example method 1100 is illustrated and described as including particular operations performed in a particular order, it is understood that this is an example. In various implementations, various orders of the same, similar, and/or different operations may be performed without departing from the scope of the present disclosure.

For example, the operation 1140 is illustrated and described as storing the one or more associations. However, it is understood that this in an example. In various implementations, the electronic device may instead direct another device and/or system to store the associations. Various configurations are possible and contemplated without departing from the scope of the present disclosure.

Figure 12:
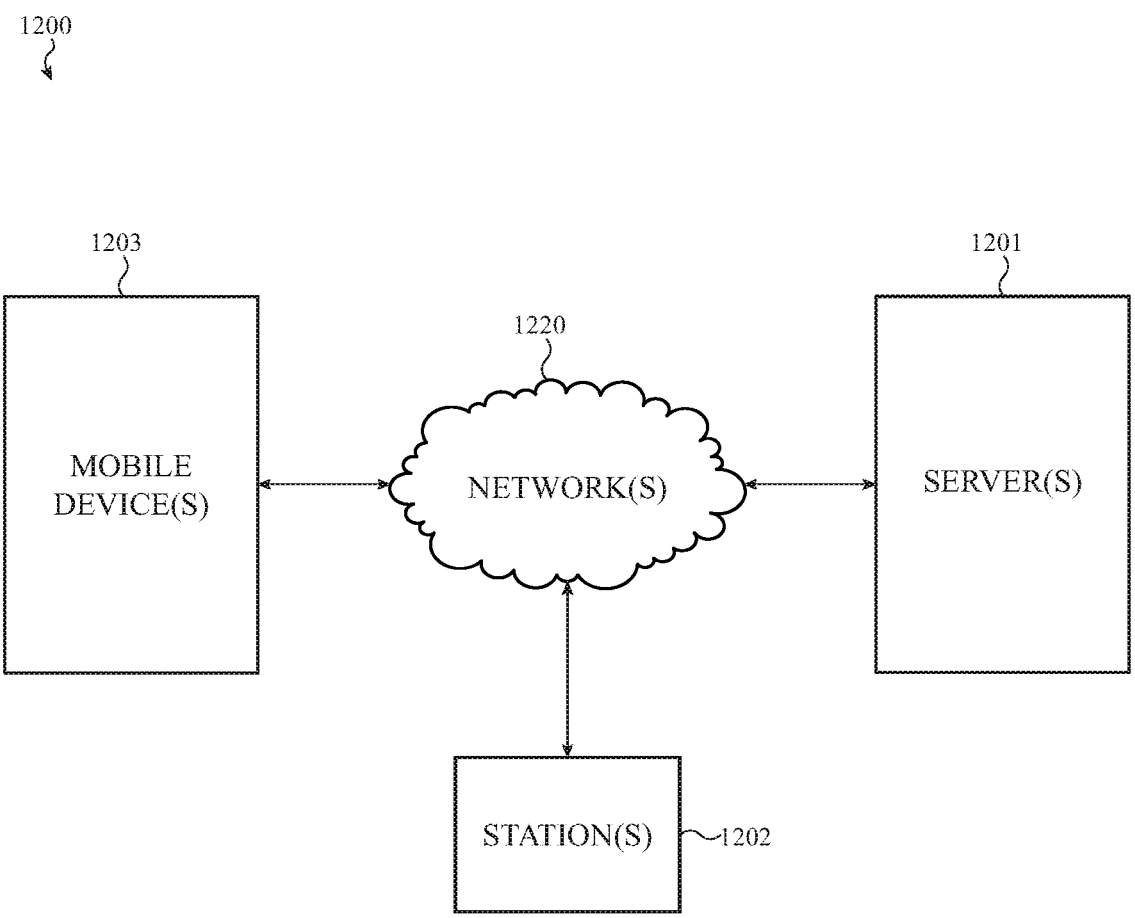
FIG. 12 depicts a fourth example system for biometric gallery management using wireless identifiers.

FIG. 12 depicts a fourth example system 1200 for biometric gallery management using wireless identifiers. The system 1200 may include one or more biometric identification and/or other stations 1202 that are operable to communicate with one or more servers 1201 and/or server allocations via one or more networks 1220 to biometrically identify and/or verify one or more people and/or one or more mobile devices and/or other electronic devices 1203 that are able to execute one or more apps and/or applications and communicate with the one or more servers 1201 via one or more networks 1220.

In various implementations, the system 1200 may perform biometric gallery management using information in an app or application executing on the mobile device and/or other electronic device 1203. By way of example, a person may use the app or application executing on the mobile device and/or other electronic device 1203 to check in for a flight, hotel reservation, rental vehicle registration, and/or other item for which a person may check in. The app or application may be associated with the system 1200 (such as directly, via another app or application executing on mobile device or other electronic device that is linked to the app or application, and so on) and may notify the system 1200 (such by communicating with the server 1201 and/or another device) that the person has checked in for the flight, hotel reservation, rental vehicle registration, and/or other item. In response, the system 1200 (such as via the server 1201, the station 1202, and so on) may determine a location associated with the flight, hotel reservation, rental vehicle registration, and/or other item, determine one or more stations 1202 associated with the location, and load one or more digital representations of biometrics associated with the person from a main gallery into one or more local galleries, which may then be used to perform one or more biometric identifications and/or verifications.

In various other implementations, the app or application may access location information for the mobile device and/or other electronic device 1203 and notify the system 1200 of such, which the system 1200 (such as via the server 1201, the station 1202, and so on) may use to determine one or more associated stations 1202 for which to load one or more digital representations of biometrics associated with the person from the main gallery into the one or more local galleries rather than doing so based on a determination of a location associated with the flight, hotel reservation, rental vehicle registration, and/or other item. In still other implementations, the app or application may not be an app or application that person uses to check in for a flight, hotel reservation, rental vehicle registration, and/or other item but may instead be an app or application that monitors another app or application that the person does use to check in for a flight, hotel reservation, rental vehicle registration, and/or other item and the monitoring app or application may notify the system 1200 (such by communicating with the server 1201 and/or another device) based thereon. Various configurations are possible and contemplated without departing from the scope of the present disclosure.

By way of another example, rather than an app or application that person uses to check in for a flight, hotel reservation, rental vehicle registration, and/or other item, in some implementations, the app or application executing on the mobile device and/or other electronic device 1203 may be an app or application that the person uses for various other purposes (such as providing a payment by providing one or more digital representations of one or more biometrics that are used to access associated payment information, providing health-related or other access authorization proof providing one or more digital representations of one or more biometrics that are used to access information related to whether or not the person should be provided access, accessing information tailored for the person provided in response to providing one or more digital representations of one or more biometrics that are used to tailor the information for the person, and so on). When the person uses the app or application, the app or application may access location information for the mobile device and/or other electronic device 1203 and notify the system 1200 of the app or application use and the location information, which the system 1200 (such as via the server 1201, the station 1202, and so on) may use to determine one or more associated stations 1202 for which to load one or more digital representations of biometrics associated with the person from a main gallery into one or more local galleries.

In various other implementations, the system 1200 may determine a location using notice of the use received from the app or application rather than the app or application communicating location information accessed from the mobile device and/or other electronic device 1203. In still other implementations, the app or application may not be an app or application that person uses but may instead be an app or application that monitors another app or application that the person does use and the monitoring app or application may notify the system 1200 (such by communicating with the server 1201 and/or another device) based thereon. Various configurations are possible and contemplated without departing from the scope of the present disclosure.

Figure 13:
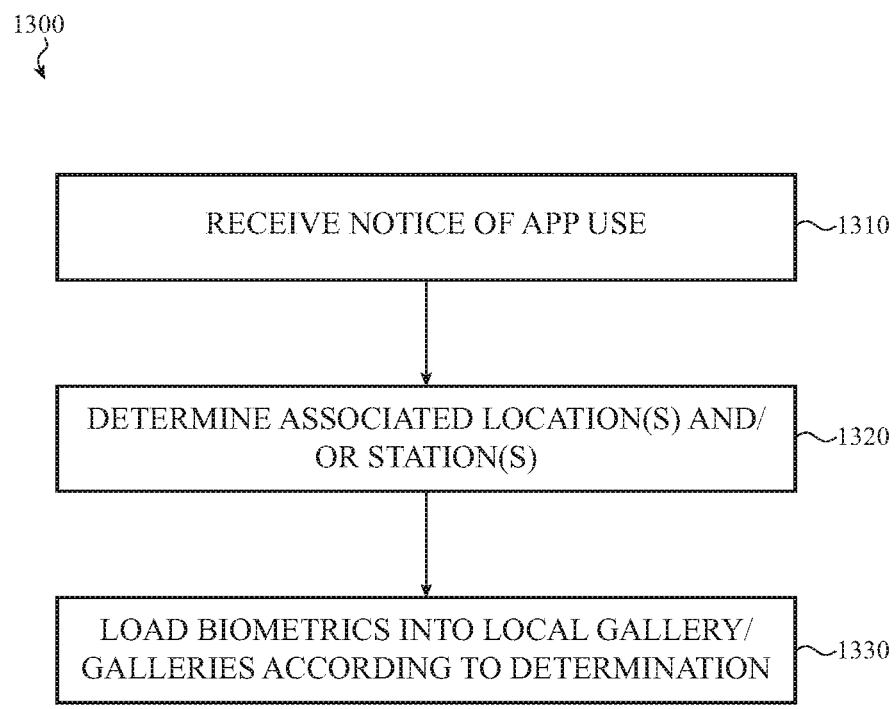
FIG. 13 depicts an eighth example method for biometric gallery management using wireless identifiers. This eighth example method may be performed by the system of FIG. 12.

FIG. 13 depicts an eighth example method 1300 for biometric gallery management using wireless identifiers. This eighth example method 1300 may be performed by the system 1200 of FIG. 12.

At operation 1310, an electronic device (such as the station 1202 of FIG. 12, the server 1201 of FIG. 12, and so on) may receive notification of use of one or more apps or applications executing on one or more mobile devices and/or other electronic devices. By way of example, the app or application executing may be one that a person uses to check in for a flight, hotel reservation, rental vehicle registration, and/or other item for which a person may check in. By way of another example, rather than an app or application that person uses to check in for a flight, hotel reservation, rental vehicle registration, and/or other item, in some implementations, the app or application may be an app or application that the person uses for various other purposes (such as providing a payment by providing one or more digital representations of one or more biometrics that are used to access associated payment information, providing health-related or other access authorization proof providing one or more digital representations of one or more biometrics that are used to access information related to whether or not the person should be provided access, accessing information tailored for the person provided in response to providing one or more digital representations of one or more biometrics that are used to tailor the information for the person, and so on).

At operation 1320, the electronic device may determine one or more locations and/or stations associated with the use. For example, the electronic device may determine one or more locations and/or stations corresponding to a flight, hotel reservation, rental vehicle registration, and/or other item for which the person checked in. By way of another example, the app or application may access location information for the mobile device and/or other electronic device and notify the electronic device of the location information, which the electronic device may use to determine one or more associated stations. In still other examples, the electronic device may determine a location using notice of the use received from the app or application rather than the app or application communicating location information accessed from the mobile device and/or other electronic device. In yet other implementations, the app or application may not be an app or application that person uses but may instead be an app or application that monitors another app or application that the person does use and the monitoring app or application may notify the electronic device based thereon.

At operation 1330, the electronic device may load one or more digital representations of one or more biometrics into one or more local galleries from a main gallery according to the determination.

By way of example, a person may use the app or application executing on the mobile device and/or other electronic device to check in for a flight, hotel reservation, rental vehicle registration, and/or other item for which a person may check in. The app or application may be associated with the electronic device (such as directly, via another app or application executing on mobile device or other electronic device that is linked to the app or application, and so on) and may notify the electronic device that the person has checked in for the flight, hotel reservation, rental vehicle registration, and/or other item. In response, the electronic device may determine a location associated with the flight, hotel reservation, rental vehicle registration, and/or other item, determine one or more stations associated with the location, and load one or more digital representations of biometrics associated with the person from a main gallery into one or more local galleries, which may then be used to perform one or more biometric identifications and/or verifications.

In various other implementations, the app or application may access location information for the mobile device and/or other electronic device and notify the electronic device of such, which the electronic device may use to determine one or more associated stations for which to load one or more digital representations of biometrics associated with the person from the main gallery into the one or more local galleries rather than doing so based on a determination of a location associated with the flight, hotel reservation, rental vehicle registration, and/or other item. In still other implementations, the app or application may not be an app or application that person uses to check in for a flight, hotel reservation, rental vehicle registration, and/or other item but may instead be an app or application that monitors another app or application that the person does use to check in for a flight, hotel reservation, rental vehicle registration, and/or other item and the monitoring app or application may notify the electronic device based thereon. Various configurations are possible and contemplated without departing from the scope of the present disclosure.

By way of another example, rather than an app or application that person uses to check in for a flight, hotel reservation, rental vehicle registration, and/or other item, in some implementations, the app or application executing on the mobile device and/or other electronic device may be an app or application that the person uses for various other purposes (such as providing a payment by providing one or more digital representations of one or more biometrics that are used to access associated payment information, providing health-related or other access authorization proof providing one or more digital representations of one or more biometrics that are used to access information related to whether or not the person should be provided access, accessing information tailored for the person provided in response to providing one or more digital representations of one or more biometrics that are used to tailor the information for the person, and so on). When the person uses the app or application, the app or application may access location information for the mobile device and/or other electronic device and notify the electronic device of the app or application use and the location information, which the electronic device may use to determine one or more associated stations for which to load one or more digital representations of biometrics associated with the person from a main gallery into one or more local galleries.

In various other implementations, the electronic device may determine a location using notice of the use received from the app or application rather than the app or application communicating location information accessed from the mobile device and/or other electronic device. In still other implementations, the app or application may not be an app or application that person uses but may instead be an app or application that monitors another app or application that the person does use and the monitoring app or application may notify the electronic device based thereon. Various configurations are possible and contemplated without departing from the scope of the present disclosure.

In various examples, this example method 1300 may be implemented using a group of interrelated software modules or components that perform various functions discussed herein. These software modules or components may be executed within a cloud network and/or by one or more computing devices, such as the server 1201 of FIG. 12.

Although the example method 1300 is illustrated and described as including particular operations performed in a particular order, it is understood that this is an example. In various implementations, various orders of the same, similar, and/or different operations may be performed without departing from the scope of the present disclosure.

For example, the operation 1310 is illustrated and described as the electronic device receiving notification of use of one or more apps or applications executing on one or more mobile devices and/or other electronic devices. However, it is understood that this is an example. In other implementations, the electronic device may instead receive location information for on one or more mobile devices and/or other electronic devices, such as from one or more apps or applications executing on the one or more mobile devices and/or other electronic devices. Various configurations are possible and contemplated without departing from the scope of the present disclosure.

In various implementations, a system for biometric gallery management using wireless identifiers may include a server and a station. The server may be operable to receive a wireless identifier at a first time, receive a digital representation of a first biometric, and store an association between the wireless identifier and the digital representation of the first biometric in a storage medium. The station may be operable to receive the wireless identifier at a second time, communicate the wireless identifier to the server, load the digital representation of the first biometric into a local gallery based on a response from the server, and perform a biometric identification by comparing a digital representation of a second biometric to the digital representation of the first biometric stored in the local gallery.

In some examples, the server may be further operable to anonymize the wireless identifier in the association by hashing the wireless identifier. In a number of examples, the server may be further operable to receive a request to remove the wireless identifier and remove the association and the wireless identifier from the storage medium in response to the request. In various examples, the server may be further operable to receive a request to remove the association and remove the association from the storage medium in response to the request.

In a number of examples, the server may be further operable to determine that the wireless identifier is included in multiple associations and remove at least one of the multiple associations from the storage medium. In some examples, the server may be further operable to determine that the wireless identifier is unassociated with a threshold number of subsequent identifications is not subsequently received within a threshold amount of time and, in response to determining that the wireless identifier is unassociated with the threshold number of subsequent identifications is not subsequently received within a threshold amount of time, remove the association from the storage medium. In various examples, the server may be further operable to receive a notification related to information in an app or application executing on an electronic device related to an activity performed by a person and instruct the station to load a digital representation of a third biometric associated with the person into the local gallery in response to the notification.

In some implementations, a system for biometric gallery management using wireless identifiers may include a communication unit operable to receive a wireless identifier, a biometric reader device operable to generate a digital representation of a biometric, a non-transitory storage medium that stores instructions, and a processor. The processor may be operable to execute the instructions to receive at least one stored digital representation of a biometric to load into a local gallery from a server in response to communicating the wireless identifier and perform a biometric identification by comparing the digital representation of the biometric to the at least one stored digital representation of the biometric in the local gallery.

In various examples, the wireless identifier may be a first wireless identifier, the digital representation of the biometric may be a digital representation of a first biometric, and the processor may be further operable to receive a second wireless identifier, receive a digital representation of a second biometric, and request that the server associate the second wireless identifier with the digital representation of the second biometric. In some such examples, the processor may request that the server associate the second wireless identifier with the digital representation of the second biometric when the digital representation of the second biometric is received within a threshold amount of time of when the second wireless identifier is received. In a number of such examples, the processor may communicate with a mobile device via the communication unit using the second wireless identifier. In various such examples, the processor may receive a confirmation from the mobile device to associate the second wireless identifier with the digital representation of the second biometric.

In some examples, the processor may be further operable to transmit the digital representation of the biometric to the server if the biometric identification using the local gallery fails.

In a number of implementations, a system for biometric gallery management using wireless identifiers may include a memory allocation configured to store at least one executable asset and a processor allocation configured to access the memory allocation and execute the at least one executable asset to instantiate a gallery management service and a biometric identification service. The gallery management service may be operable to receive a wireless identifier at a first time, receive a digital representation of a first biometric, store an association between the wireless identifier and the digital representation of the first biometric in a storage medium, and load the digital representation of the first biometric into a gallery in response to receiving the wireless identifier at a second time. The biometric identification service may be operable to perform a biometric identification by comparing a digital representation of a second biometric to the digital representation of the first biometric stored in the gallery.

In various examples, the gallery management service may receive the wireless identifier from an associated application executing on a mobile device associated with the wireless identifier. In some examples, the system may further include a wireless beacon and the gallery management service may receive the wireless identifier from a mobile device after the mobile device receives a signal from the wireless beacon. In a number of examples, the gallery management service may be further operable to determine that the wireless identifier is associated with multiple identities and disassociate the wireless identifier from an identity of the multiple identities that has the fewest associations with the wireless identifier. In various examples, the wireless identifier may be a first wireless identifier, the digital representation of the biometric may be a digital representation of a first biometric, and the gallery management service may be further operable to receive a second wireless identifier, receive information specifying an identity that is associated with a digital representation of a second biometric, and associate the second wireless identifier with the digital representation of the second biometric. In some such examples, the gallery management service may receive the second wireless identifier and the information from a mobile device associated with the second wireless identifier.

In a number of examples, the wireless identifier may be a first wireless identifier and the gallery management service may be further operable to determine that the wireless identifier is not subsequently received and that a second wireless identifier is associated with the digital representation of the biometric and remove the association.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to biometric gallery management using wireless identifiers. One or more wireless identifiers that correspond to one or more mobile devices (such as smart phones, tablet computing devices, cellular telephones, wearable devices, smart watches, fitness monitors, digital media players, medical devices, and/or other mobile computing devices) that people carry may be associated with digital representations of biometrics corresponding to the people. Wireless identifiers corresponding to mobile devices proximate to a biometric reader device may be monitored. Upon detection of wireless identifiers corresponding to mobile devices proximate to the biometric reader device, the associated digital representations of biometrics may be loaded from a main gallery into one or more local galleries, which may then be used to perform one or more biometric identifications and/or verifications. Associations between digital representations of biometrics and one or more wireless identifiers may be determined, stored, and/or updated using digital representations of biometrics from one or more identifications and/or verifications and wireless identifiers corresponding to one or more mobile devices detected proximate to one or more biometric reader devices.

The present disclosure recognizes that biometric and/or other personal data is owned by the person from whom such biometric and/or other personal data is derived. This data can be used to the benefit of those people. For example, digital representations of biometrics may be used to conveniently and reliably identify and/or authenticate the identity of people, access securely stored financial and/or other information associated with the digital representations of biometrics, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third-party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for biometric gallery management using wireless identifiers, comprising:
   a server that is operable to:
     receive a wireless identifier at a first time;
     receive a digital representation of a first biometric; and
     store an association between the wireless identifier and the digital representation of the first biometric in a storage medium; and a station that is operable to:
  receive the wireless identifier at a second time;
  communicate the wireless identifier to the server;
  load the digital representation of the first biometric into a local gallery based on a response from the server;
  perform a biometric identification by comparing a digital representation of a second biometric to the digital representation of the first biometric stored in the local gallery; and
  transmit the digital representation of the second biometric to the server if the biometric identification using the local gallery fails.

2. The system of claim 1, wherein the server is further operable to anonymize the wireless identifier in the association by hashing the wireless identifier.

3. The system of claim 1, wherein the server is further operable to:
  receive a request to remove the wireless identifier; and
  remove the association and the wireless identifier from the storage medium in response to the request.

4. The system of claim 1, wherein the server is further operable to:
  receive a request to remove the association; and
  remove the association from the storage medium in response to the request.

5. The system of claim 1, wherein the server is further operable to:
  determine that the wireless identifier is included in multiple associations; and
  remove at least one of the multiple associations from the storage medium.

6. The system of claim 1, wherein the server is further operable to:
  determine that the wireless identifier is unassociated with a threshold number of subsequent identifications or is not subsequently received within a threshold amount of time; and
  in response to determining that the wireless identifier is unassociated with the threshold number of subsequent identifications or is not subsequently received within the threshold amount of time, remove the association from the storage medium.

7. The system of claim 1, wherein the server is further operable to:
  receive a notification related to information in an app or application executing on an electronic device related to an activity performed by a person; and
  instruct the station to load a digital representation of a third biometric associated with the person into the local gallery in response to the notification.

8. A system for biometric gallery management using wireless identifiers, comprising:
  a biometric reader device operable to generate a digital representation of a biometric;
  a non-transitory storage medium that stores instructions; and
  a processor that is operable to execute the instructions to:
    receive at least one stored digital representation of a biometric to load into a local gallery from a server in response to communicating a wireless identifier;
    perform a biometric identification by comparing the digital representation of the biometric to the at least one stored digital representation of the biometric in the local gallery; and
    transmit the digital representation of the biometric to the server if the biometric identification using the local gallery fails.

9. The system of claim 8, wherein:
  the wireless identifier is a first wireless identifier;
  the digital representation of the biometric is a digital representation of a first biometric; and
  the processor is further operable to:
    receive a second wireless identifier;
    receive a digital representation of a second biometric; and
    request that the server associate the second wireless identifier with the digital representation of the second biometric.

10. The system of claim 9, wherein the processor requests that the server associate the second wireless identifier with the digital representation of the second biometric when the digital representation of the second biometric is received within a threshold amount of time of when the second wireless identifier is received.

11. A system for biometric gallery management using wireless identifiers, comprising:
  a biometric reader device operable to generate a digital representation of a biometric;
  a non-transitory storage medium that stores instructions; and
  a processor that is operable to execute the instructions to:
    receive at least one stored digital representation of a biometric to load into a local gallery from a server in response to communicating with a wireless identifier; and
    perform a biometric identification by comparing the digital representation of the biometric to the at least one stored digital representation of the biometric in the local gallery; wherein:
    the wireless identifier is a first wireless identifier;
    the digital representation of the biometric is a digital representation of a first biometric; and
    the processor is further operable to:
      receive a second wireless identifier;
      receive a digital representation of a second biometric;
      request that the server associate the second wireless identifier with the digital representation of the second biometric; and
      communicate with a mobile device using the second wireless identifier.

12. The system of claim 11, wherein the processor receives a confirmation from the mobile device to associate the second wireless identifier with the digital representation of the second biometric.

13. The system of claim 11, wherein the first wireless identifier is associated with a different wireless communication type than the second wireless identifier.

14. A system for biometric gallery management using wireless identifiers, comprising:
  a memory allocation comprising memory configured to store at least one executable asset; and
  a processor allocation comprising one or more processors configured to access the memory allocation and execute the at least one executable asset to instantiate:
    a gallery management service that is operable to:
      receive a wireless identifier at a first time;
      receive a digital representation of a first biometric;
      store an association between the wireless identifier and the digital representation of the first biometric in a storage medium;
      determine that the wireless identifier is associated with multiple identities;

disassociate the wireless identifier from an identity of the multiple identities that has fewest associations with the wireless identifier; and
load the digital representation of the first biometric into a gallery in response to receiving the wireless identifier at a second time; and
a biometric identification service that is operable to perform a biometric identification by comparing a digital representation of a second biometric to the digital representation of the first biometric stored in the gallery.

15. The system of claim 14, wherein the gallery management service receives the wireless identifier from an associated application executing on a mobile device associated with the wireless identifier.

16. The system of claim 14, further comprising a wireless beacon, wherein the gallery management service receives the wireless identifier from a mobile device after the mobile device receives a signal from the wireless beacon.

17. The system of claim 14, wherein the gallery management service is further operable to determine which of the multiple identities has the fewest associations with the wireless identifier.

18. The system of claim 14, wherein:
the wireless identifier is a first wireless identifier; and
the gallery management service is further operable to:
receive a second wireless identifier;
receive information specifying an identity that is associated with a digital representation of a third biometric; and
associate the second wireless identifier with the digital representation of the third biometric.

19. The system of claim 18, wherein the gallery management service receives the second wireless identifier and the information from a mobile device associated with the second wireless identifier.

20. The system of claim 14, wherein:
the wireless identifier is a first wireless identifier; and
the gallery management service is further operable to:
determine that the wireless identifier is not subsequently received and that a second wireless identifier is associated with the digital representation of the first biometric; and
remove the association.

* * * * *